United States Patent
Ohta

(10) Patent No.: US 11,669,458 B2
(45) Date of Patent: Jun. 6, 2023

(54) COMPUTER-READABLE RECORDING MEDIUM STORING ADJUSTMENT PROGRAM AND ADJUSTMENT METHOD

(71) Applicant: FUJITSU LIMITED, Kawasaki (JP)

(72) Inventor: Eiji Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/690,041

(22) Filed: Mar. 9, 2022

(65) Prior Publication Data

US 2023/0004501 A1 Jan. 5, 2023

(30) Foreign Application Priority Data

Jun. 30, 2021 (JP) .............................. JP2021-108958

(51) Int. Cl.
| | | |
|---|---|---|
| *G06F 12/0895* | (2016.01) | |
| *G06F 11/30* | (2006.01) | |
| *G06F 11/34* | (2006.01) | |
| *G06F 12/0871* | (2016.01) | |

(52) U.S. Cl.
CPC ...... *G06F 12/0895* (2013.01); *G06F 11/3037* (2013.01); *G06F 11/3409* (2013.01); *G06F 12/0871* (2013.01); *G06F 2212/1021* (2013.01)

(58) Field of Classification Search
CPC ............. G06F 12/0895; G06F 12/0871; G06F 2212/1021

USPC .......................................................... 711/118
See application file for complete search history.

(56) References Cited

U.S. PATENT DOCUMENTS

| | | | |
|---|---|---|---|
| 2005/0071572 A1 | 3/2005 | Nakashima et al. | |
| 2008/0256303 A1* | 10/2008 | Croxford | G06F 12/1027 |
| | | | 711/144 |

FOREIGN PATENT DOCUMENTS

| | | |
|---|---|---|
| JP | 2009-277243 A | 11/2009 |
| JP | 2011-203995 A | 10/2011 |

\* cited by examiner

*Primary Examiner* — Edward J Dudek, Jr.
*Assistant Examiner* — Sidney Li
(74) *Attorney, Agent, or Firm* — Fujitsu Patent Center

(57) ABSTRACT

A non-transitory computer-readable recording medium stores an adjustment program for causing a computer to perform a process including: acquiring a computation performance characteristic that indicates a computation performance value that corresponds to each adjustable dimension, through computation in which a cache memory in a processor that includes the cache memory is used; extracting, by using the computation performance characteristic, an adjustment condition for adjusting an adjustable dimension for which a decrease in computation performance due to a cache miss caused by a cache-line conflict in the cache memory occurs; and inserting adjustment processing based on the adjustment condition into a specific program that is executed by the processor and uses the adjustable dimension.

5 Claims, 23 Drawing Sheets

FIG. 2

| ADJUSTABLE DIMENSION (L) | COMPUTATION PERFORMANCE (PDATA) |
|---|---|
| 2 | $PDATA_1$ |
| 3 | $PDATA_2$ |
| 4 | $PDATA_3$ |
| 5 | $PDATA_4$ |
| ⋮ | ⋮ |
| LMAX | $PDATA_n$ |

21

| ADJUSTABLE DIMENSION (L) [ELEMENT] | COMPUTATION PERFORMANCE (PDATA) [TFLOPS] |
|---|---|
| 8 | 0.01 |
| ... | ... |
| 2000 | 2.75 |
| 2008 | 2.76 |
| 2016 | 2.69 |
| 2024 | 2.66 |
| 2032 | 2.67 |
| 2040 | 2.65 |
| 2048 | 2.43 |
| 2056 | 2.56 |
| 2064 | 2.57 |
| 2072 | 2.61 |
| 2080 | 2.60 |
| 2088 | 2.70 |
| 2096 | 2.72 |
| ... | ... |
| 8192 | 1.65 |

| ADJUSTABLE DIMENSION START POINT (LS) | ADJUSTABLE DIMENSION END POINT (LE) | ADJUSTED ADJUSTABLE DIMENSION (LA) |
|---|---|---|
| 1992 | 2096 | 2200(2104) |
| 4080 | 4128 | 4200(4136) |

*VALUE IN () OF ADJUSTED ADJUSTABLE DIMENSION FIELD: ADJUSTABLE DIMENSION BEFORE ROUNDING

FIG. 15

SAMPLE PROGRAM

```
PROGRAM MAIN
IMPLICIT NONE
INTEGER M, K, N, WM, I, J
PARAMETER (K=200, N=1000)
DOUBLE PRECISION ALPHA, BETA, rnd, B(K,N)
DOUBLE PRECISION, ALLOCATABLE :: A(:,:), C(:,:)

ALPHA = 1.0
BETA = 0.0

DO I = 1, 5
  DO J = 1, 400
    CALL random_number( rnd )
    rnd = 1900 + rnd * 200
    M = INT( rnd )
```

INSERT ADJUSTABLE DIMENSION SETTING BLOCK (B10$_A$)

```
IF( M >= 1992 .AND. M <= 2096 ) THEN
  WM = 2200
ELSE IF( M >= 4080 .AND. M <= 4128 ) THEN
  WM = 4200
END IF
#endif
```

DATA DEFINITION (B20$_A$)

```
ALLOCATE( A( M, K ) )
ALLOCATE( C( WM, N ) )
```

---

(B20$_A$)
```
CALL INIT_MATRIX( )
CALL DGEMM('N','N',M,N,K,ALPHA,A,M,B,K,BETA,C,WM)
```

COMPUTATION PROCESSING BLOCK (B30$_A$)

```
DEALLOCATE( A )
DEALLOCATE( C )

END DO
STOP

CONTAINS

SUBROUTINE INIT_MATRIX( )
IMPLICIT NONE

INTEGER    I, J

DO I = 1, M
  DO J = 1, K
    A(I,J) = (I-1) * K + J
  END DO
END DO
      ...
END SUBROUTINE
END PROGRAM
```

FIG. 16

| SOURCE CODE | ELAPSED TIME [SECONDS] | PERFORMANCE IMPROVEMENT EFFECT [%] |
|---|---|---|
| ORIGINAL | 29.90 | - |
| ADJUSTABLE DIMENSION SETTING BLOCK INSERTED | 28.07 | 6.1% |

*PERFORMANCE IMPROVEMENT EFFECT: RATIO OF REDUCTION IN ELAPSED TIME TO ORIGINAL ELAPSED TIME

FIG. 17

| SOURCE CODE | ELAPSED TIME [SECONDS] | PERFORMANCE IMPROVEMENT EFFECT [%] |
|---|---|---|
| ORIGINAL | 0.68 | - |
| ADJUSTABLE DIMENSION SETTING BLOCK INSERTED | 0.64 | 5.9% |

*PERFORMANCE IMPROVEMENT EFFECT: RATIO OF REDUCTION IN ELAPSED TIME TO ORIGINAL ELAPSED TIME

| ADJUSTABLE DIMENSION (L) [ELEMENT] | COMPUTATION PERFORMANCE (PDATA) [TFLOPS] |
|---|---|
| 8 | 0.01 |
| ... | ... |
| 2000 | 2.92 |
| 2008 | 2.93 |
| 2016 | 2.89 |
| 2024 | 2.87 |
| 2032 | 2.92 |
| 2040 | 2.95 |
| 2048 | 2.92 |
| 2056 | 2.92 |
| 2064 | 2.93 |
| 2072 | 2.95 |
| 2080 | 2.90 |
| 2088 | 2.90 |
| 2096 | 2.93 |
| ... | ... |
| 8192 | 1.65 |

|  | (0, *) | | (1, *) | | (2, *) | | ... |
|---|---|---|---|---|---|---|---|
| (*, 0) | A(1) | A(2) | A(3) | A(4) | A(5) | A(6) | ... |
| (*, 1) | B(1) | B(2) | B(3) | B(4) | B(5) | B(6) | ... |
| (*, 2) | C(1) | C(2) | C(3) | C(4) | C(5) | C(6) | ... |
| (*, 3) | D(1) | D(2) | D(3) | D(4) | D(5) | D(6) | ... |

COMPUTER-READABLE RECORDING MEDIUM STORING ADJUSTMENT PROGRAM AND ADJUSTMENT METHOD

CROSS-REFERENCE TO RELATED APPLICATION

This application is based upon and claims the benefit of priority of the prior Japanese Patent Application No. 2021-108958, filed on Jun. 30, 2021, the entire contents of which are incorporated herein by reference.

FIELD

The embodiment discussed herein is related to a computer-readable recording medium storing an adjustment program, and the like.

BACKGROUND

Many recent microprocessors are equipped with a cache memory. One cause that hinders optimization of the performance of a program is instability of the performance of this cache memory. A cache memory has a smaller capacity than a main storage memory and is accessible in units of several clocks. Thus, keeping desired data in the cache memory is a key for high-performance computation. Avoiding a state in which data is not present in the cache memory, for example, a "cache miss" is important for stabilization of the performance of the cache memory.

Japanese Laid-open Patent Publication No. 2011-203995 and Japanese Laid-open Patent Publication No. 2009-277243 are disclosed as related art.

SUMMARY

According to an aspect of the embodiments, a non-transitory computer-readable recording medium stores an adjustment program for causing a computer to perform a process including: acquiring a computation performance characteristic that indicates a computation performance value that corresponds to each adjustable dimension, through computation in which a cache memory in a processor that includes the cache memory is used; extracting, by using the computation performance characteristic, an adjustment condition for adjusting an adjustable dimension for which a decrease in computation performance due to a cache miss caused by a cache-line conflict in the cache memory occurs; and inserting adjustment processing based on the adjustment condition into a specific program that is executed by the processor and uses the adjustable dimension.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of characteristic information according to the embodiment;

FIG. 14 is a diagram illustrating a specific example of the suppression condition information according to the embodiment;

FIG. 15 is a diagram illustrating a specific example of insertion of the adjustable dimension setting block;

FIG. 16 is a diagram illustrating an execution result of a sample program;

FIG. 17 is a diagram illustrating an execution result of open source software (OSS);

FIG. 20 is a diagram illustrating a reference example of storage of each array in a cache.

DESCRIPTION OF EMBODIMENTS

Figure 1:
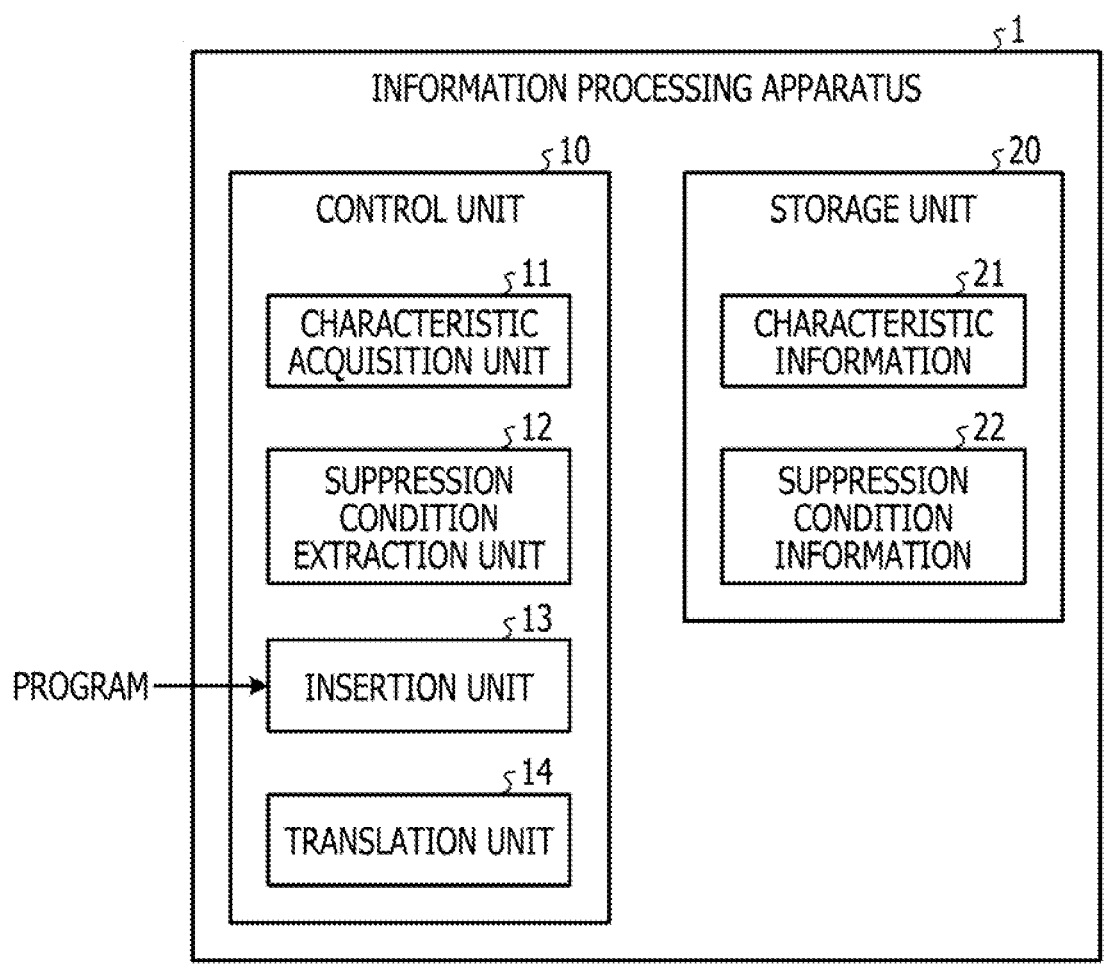
FIG. 1 is a diagram illustrating an example of a functional configuration of an information processing apparatus according to an embodiment.

Major occurrence conditions of cache misses include a compulsory miss, a capacity miss, and a conflict miss. The compulsory miss is a cache miss that occurs at the time of the first access to a cache line, and is easily avoidable by a hardware prefetch function (or a software prefetch function). The capacity miss is a cache miss that occurs as a result of the number of lines desired to be cached exceeding a cache capacity, and is easily avoidable by blocking or the like in which part of data is kept in a cache memory as much as possible limitedly for a certain section of a program.

On the other hand, the conflict miss results from a structure and a scheme of a cache memory, and it is not easy to understand the cause of the conflict miss.

A simple example of the conflict miss will be described. FIG. 20 is a diagram illustrating a reference example of storage of each array in a cache. It is assumed that one-dimensional arrays A, B, C, and D are used in a processing block (core loop) of a certain program. Each array is page-aligned, and accesses to elements, with the same index, of the respective arrays are accesses to the same cache line. For example, it is assumed that heads such as A(1) of the respective arrays are aligned to correspond to (0, *). In the case where a cache is configured such that the number of ways is four and the line width is 2 words, each array is stored in the cache without any conflict as illustrated in FIG. 20.

Addition of an array E to this processing block induces a cache miss and the performance of the program degrades. The arrays that use the line (0, *) are {A(1), A(2)}, {B(1), B(2)}, {C(1), C(2)}, {D(1), D(2)}, and {E(1), E(2)}. A unit surrounded by { } corresponds to a cache line.

In the case where an access is made in an order of A(1), B(1), C(1), D(1), E(1), A(2), . . . in the processing block, the access up to D(1) proceeds without any problem since (0, *) is four-way. When E(1) is accessed, the line (0, 0) in which A(1) is stored is written back to the main storage memory, and {E(1), E(2)} is stored in that portion. In a subsequent access to A(2), the access is made to the main storage memory since the line for {A(1), A(2)} is not present in the cache. At this time, the line (0, 1) in which {B(1), B(2)} is stored is written back to the main storage memory, and {A(1), A(2)} is stored in the line (0, 1).

In this manner, a cache-line conflict occurs at all times, and a chain of cache misses occurs. The occurrence of such a chain of cache misses is referred to as cache thrashing. A major cause of cache thrashing is, for example, low associativity (of the number of ways) of a cache viewed from hardware.

In the case where the array E is not page-aligned and E(1) is stored in (1, *) of the cache, no cache conflict occurs even if similar accesses are made.

As described above, the conflict miss results from the structure of the cache memory, the cache algorithm scheme, and the page alignment of data. Thus, it is difficult to determine the occurrence of a conflict miss, identify a cause of the occurrence, and examine an avoiding method.

There is disclosed a technique for an analysis apparatus for increasing the analysis accuracy of a configuration of a sector cache in a cache memory including a sector cache mechanism. In such a technique, the analysis apparatus collects information on the number of accesses and the number of cache misses that are sampled while switching the sector configuration of the cache memory during execution of an application program by a processor, and calculates, for each sector configuration, a cache miss rate by dividing the number of cache misses by the number of accesses. The analysis apparatus is capable of outputting a sector configuration suitable for the application program.

However, there is an issue that it is difficult to stabilize the performance of a cache memory when a given program is executed. For example, a conflict miss results from the structure of the cache memory, the cache algorithm scheme, and the page alignment of data. Thus, it is not easy for a program developer to determine the occurrence of a conflict miss, identify a cause of the occurrence, and examine an avoiding method.

The related-art technique for the analysis apparatus enables the sector configuration suitable for an application program to be selected. However, the technique is applied to a cache memory including a sector cache mechanism, and is not applicable to a cache memory not including the sector cache mechanism.

In one aspect, an object is to stabilize the performance of a cache memory when a given program is executed.

Embodiments of an adjustment program and an adjustment method according to the present disclosure will be described in detail below based on the drawings. The present disclosure is not limited by these embodiments. The individual embodiments may be appropriately combined with each other within the scope without any contradiction.

Figure 21:
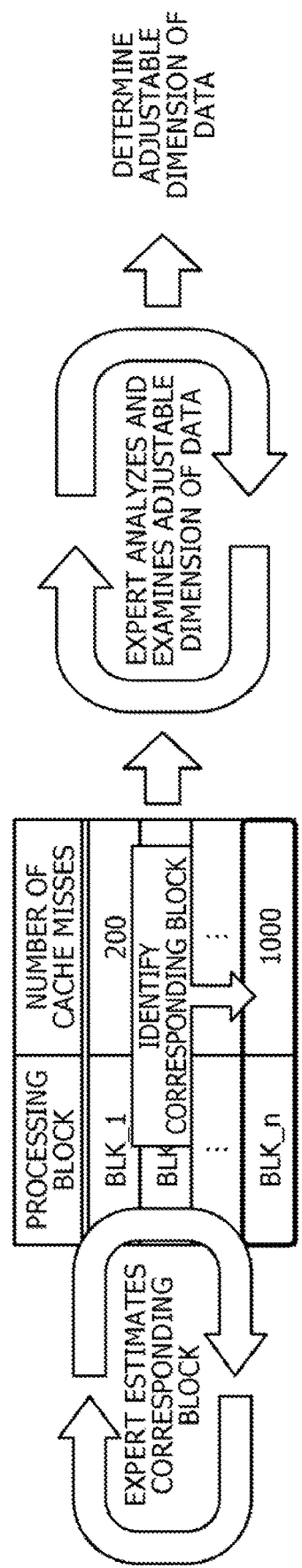
FIG. 21 is a diagram illustrating a reference example of analysis of an adjustable dimension of data.

To stabilize the performance of a cache memory, an expert analyzes an adjustable dimension of data and determines the adjustable dimension of data. The adjustable dimension of data in this case refers to a length of data, and corresponds to, for example, the number of rows of a matrix declared when a two-dimensional array is prepared in the case where FORTRAN is used as a programming language of a target program. FIG. 21 is a diagram illustrating a reference example of analysis of an adjustable dimension of data.

In the case where the computation performance in the entire (or part of) target program is markedly lower than the theoretical computation performance of a processor, a programmer investigates and identifies a cause of the computation performance degradation and makes a modification for removing that cause of the computation performance degradation in the program to improve the computation performance of the program. One candidate for the cause of the computation performance degradation is instability of the performance of a cache memory.

By using a dedicated tool, a programmer first checks an occurrence state of instability of the performance of the cache memory. By using a timing counter or the like of the processor, the dedicated tool is capable of acquiring the number of cache misses or a cache miss rate during execution of a program. However, since the acquirable value is a cumulative value or an average value at a certain interval during execution of the program, it is difficult to identify a block, in the program, where a cache miss has occurred.

As illustrated in a left diagram of FIG. 21, an expert of a cache memory estimates a corresponding block, in the program, where a cache miss has occurred and extracts source code of the corresponding block or inserts a reset instruction for the timing counter, thereby identifying the corresponding block. As illustrated in a right diagram of FIG. 21, the expert extracts an adjustable dimension of data to be used in the identified corresponding block, and determines, through analysis and examination, the adjustable dimension of data for suppressing the conflict miss due to a cache-line conflict.

As described above, the expert is able to determine the adjustable dimension of data for suppressing the conflict miss. For example, the performance of the cache memory may be stabilized when a given program is executed. However, such a method based on analysis and examination takes an enormous amount of time to determine the adjustable dimension of data for suppressing a conflict miss. Accordingly, an information processing apparatus that efficiently determines an adjustable dimension of data for suppressing a conflict miss will be described below.

EMBODIMENT

FIG. 1 is a diagram illustrating an example of a functional configuration of an information processing apparatus according to an embodiment. As illustrated in FIG. 1, an information processing apparatus 1 includes a control unit 10 and a storage unit 20. The control unit 10 is a processing unit that controls the entire information processing apparatus 1, and includes a characteristic acquisition unit 11, a suppression condition extraction unit 12, an insertion unit 13, and a translation unit 14. The storage unit 20 includes characteristic information 21 and suppression condition information 22.

The characteristic information 21 is characteristic information of computation performance corresponding to each adjustable dimension in a microprocessor in which a cache memory is mounted. The adjustable dimension is, for example, from 2 to a maximum value (LMAX). A section of the adjustable dimension for which the computation performance is less than or equal to a predetermined threshold indicates a section in which a conflict miss has presumably occurred in the cache memory. The predetermined threshold corresponds to a threshold PT-B for determining the occurrence of performance degradation described later. LMAX is calculated from a cache capacity of the cache memory mounted in the microprocessor in an execution environment. The characteristic information 21 is acquired by the characteristic acquisition unit 11 described later. An example of the characteristic information 21 will be described with reference to FIG. 2.

FIG. 2 is a diagram illustrating an example of characteristic information according to the embodiment. As illustrated in FIG. 2, the characteristic information 21 is information in which an adjustable dimension (L) and computation performance (PDATA) are associated with each other. The adjustable dimension (L) refers to a data length, and is from 2 to LMAX. LMAX is a value of a quotient obtained by dividing a capacity of a cache memory by a size of a data type. As an example, in the case where the capacity of the cache memory is 64 kilobytes (KB), the data type is a double-precision floating-point type, and the size of the data type is 8 bytes, LMAX is equal to 8192(=64×1024 bytes/8 bytes). The computation performance (PDATA) refers to a performance value obtained in the case where the adjustable dimension is given and a program for performing computation by sequentially accessing continuous addresses in a certain size (the size of the data type) is executed. An example of such a program is a matrix product computation function. In the embodiment, description will be given on the assumption that such a program is a matrix product computation function.

A relationship between the adjustable dimension L and the matrix product computation function is as follows. For example, a matrix product C of a two-dimensional matrices A and B is represented by A×B. In the case where the matrix A has m rows and p columns and the matrix B has p rows and n columns, the matrix product C has m rows and n columns. This m is the adjustable dimension in the case where FORTRAN is used as the programming language of a target program. The characteristic information 21 of the computation performance corresponding to the adjustable dimension is determined by using the program, one example of which is the matrix product computation function, because of a reason below. For example, instability of the performance of the cache memory depends on the structure of the cache memory mounted in the microprocessor that executes this program, the cache algorithm scheme, the page alignment of data, and the locality of reference of data, and a characteristic of the instability of the performance of the cache memory is acquired as a relationship with the adjustable dimension. If the computation performance corresponding to the adjustable dimension is less than or equal to the predetermined threshold, it may be determined that a conflict miss has occurred in the cache memory.

Figure 3:
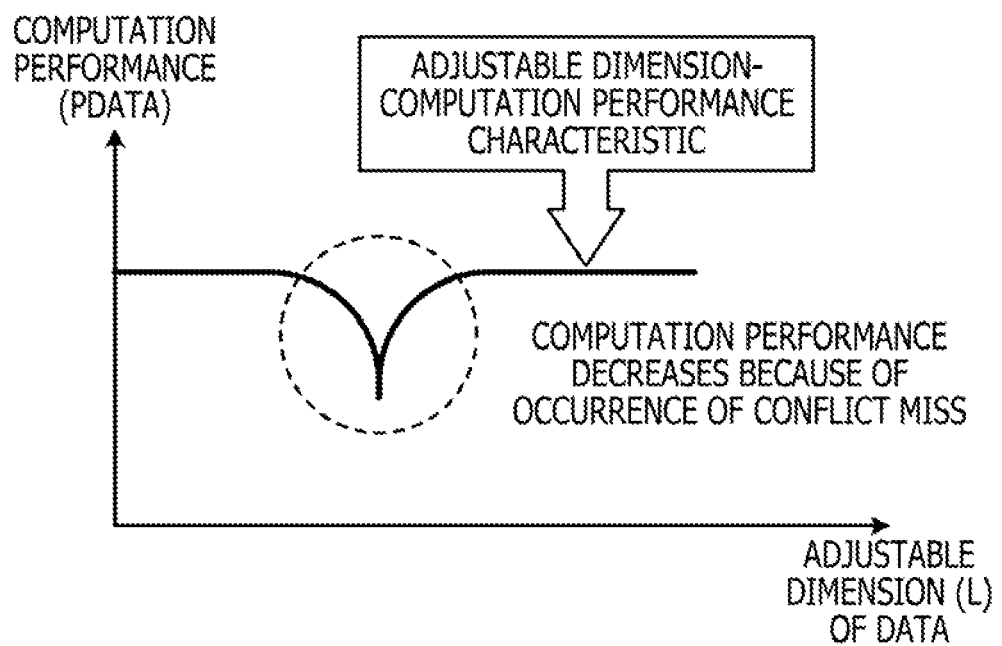
FIG. 3 is a diagram illustrating the characteristic information according to the embodiment as a graph.

FIG. 3 is a diagram illustrating the characteristic information according to the embodiment as a graph. The graph illustrated in FIG. 3 represents the characteristic information 21 between the adjustable dimension and the computation performance. In such a graph, an X-axis represents the adjustable dimension (L) of data and a Y-axis represents the computation performance (PDATA). As illustrated in FIG. 3, there is a section in which the computation performance associated with the adjustable dimension of data decreases. Such a section is a section indicated by a broken line. In such a section, the computation performance decreases because of the occurrence of a conflict miss in the cache memory. The suppression condition extraction unit 12 described later extracts such a section and extracts a suppression condition for the adjustable dimension for suppressing the occurrence of a conflict miss.

Referring back to FIG. 1, the suppression condition information 22 is information indicating the suppression condition for the adjustable dimension for suppressing the occurrence of a conflict miss in the section of the adjustable dimension in which the computation performance is less than or equal to the predetermined threshold. The suppression condition information 22 is generated by the suppression condition extraction unit 12 described later. An example of the suppression condition information 22 will be described with reference to FIG. 4.

Figure 4:
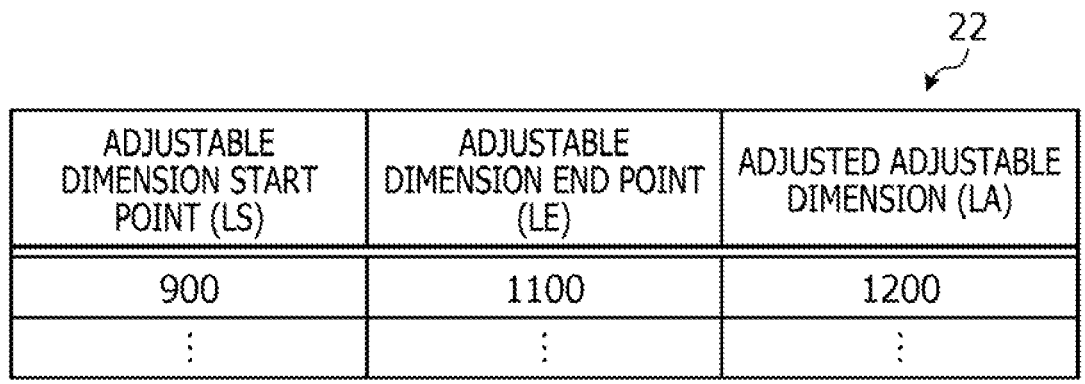
FIG. 4 is a diagram illustrating an example of suppression condition information according to the embodiment.

FIG. 4 is a diagram illustrating an example of suppression condition information according to the embodiment. As illustrated in FIG. 4, the suppression condition information 22 is information in which an adjustable dimension start point (LS), an adjustable dimension end point (LE), and an adjusted adjustable dimension (LA) are associated with one another. The adjustable dimension start point (LS) indicates a start point of the adjustable dimension estimated as a start of the decrease in computation performance due to the occurrence of a conflict miss. The adjustable dimension end point (LE) indicates an end point of the adjustable dimension estimated as an end of the decrease in computation performance due to the occurrence of a conflict miss. The adjusted adjustable dimension (LA) is an adjusted dimension of the adjustable dimension obtained when the adjustable dimension is between the adjustable dimension start point (LS) and the adjustable dimension end point (LE).

As an example, in the case where the adjustable dimension start point (LS) is "900" and the adjustable dimension end point (LE) is "1100", "1200" is stored as the adjusted adjustable dimension (LA). For example, when the adjustable dimension is between the adjustable dimension start point (LS) "900" and the adjustable dimension end point (LE) "1100", the adjustable dimension is adjusted to the adjusted adjustable dimension (LA) "1200".

Referring back to FIG. 1, the characteristic acquisition unit 11 acquires the characteristic information 21. For example, the characteristic acquisition unit 11 acquires the characteristic information 21 indicating the computation performance value corresponding to each adjustable dimension by executing the matrix product computation function that corresponds to the data type and uses each adjustable dimension as a parameter. Each adjustable dimension input as the parameter is, for example, an integer from "2" to the maximum value (LMAX) obtained from the cache memory capacity and the size of the data type. However, the minimum value is not limited to "2", and may be "3" or "8", or may be changeable by an administrator.

By using the characteristic information 21, the suppression condition extraction unit 12 extracts a suppression condition for the adjustable dimension for which a decrease in computation performance due to a conflict miss occurs.

For example, the suppression condition extraction unit 12 calculates a computation performance reference value in a section in which no conflict misses have occurred. As an example, the suppression condition extraction unit 12 calculates, based on Equation (1) below, an arithmetic mean of all the computation performances from the characteristic information 21 and sets the obtained value as a computation performance reference value PB. N in Equation (1) represents the total number of computation performances.

$$PB = \frac{1}{N}\sum_{n=1}^{N}(PDATA_n) \qquad (1)$$

In the case where the characteristic information 21 contains lots of noise such as impulse noise, the suppression condition extraction unit 12 may remove the noise by using a digital filter such as a low-pass filter before calculating the arithmetic mean.

The suppression condition extraction unit 12 sets a threshold PT-A for determining a conflict miss by using the computation performance. As an example, the suppression condition extraction unit 12 calculates a threshold A(PT-A) based on Equation (2) below. KA in Equation (2) is a positive real number.

$$PT\text{-}A = PB \times KA \qquad \text{Equation (2)}$$

For example, in the case where KA is equal to 0.9, the threshold PT-A is calculated to be PB×0.9. In such a case, the suppression condition extraction unit 12 determines that a conflict miss has occurred for the adjustable dimension for which the computation performance is 90% or less of the reference computation performance (PB). The suppression condition extraction unit 12 extracts a continuous section including this adjustable dimension as a conflict miss suppression condition extraction section.

The suppression condition extraction unit 12 sets the threshold PT-B for determining the occurrence of the performance degradation by using the computation performance in the conflict miss suppression condition extraction section. As an example, the suppression condition extraction unit 12 calculates a threshold B(PT-B) based on Equation (3) below. KB in Equation (3) is a positive real number and KB>KA holds.

$$PT\text{-}B = PB \times KB \qquad \text{Equation (3)}$$

The suppression condition extraction unit 12 extracts the start point (minimum value) of the adjustable dimension of the section in which the performance degradation due to a conflict miss has occurred. The suppression condition extraction unit 12 extracts the end point (maximum value) of the adjustable dimension of the section in which the performance degradation due to a conflict miss has occurred. For example, the suppression condition extraction unit 12 extracts the minimum value of the adjustable dimension as the adjustable dimension start point (LS) in a continuous section of the adjustable dimension for which the computation performance is less than or equal to the threshold PT-B and which includes the adjustable dimension for which the computation performance is less than or equal to the threshold PT-A. The suppression condition extraction unit 12 extracts the maximum value of the adjustable dimension as the adjustable dimension end point (LE) in the continuous section of the adjustable dimension for which the computation performance is less than or equal to the threshold PT-B and which includes the adjustable dimension for which the computation performance is less than or equal to the threshold PT-A. For example, in the case where KB is equal to 0.95, the threshold PT-B is calculated to be the reference computation performance PB×0.95. In such a case, the suppression condition extraction unit 12 determines that the performance degradation has occurred in a continuous section in which the computation performance is 95% or less of the reference computation performance (PB) in the conflict miss suppression condition extraction section. The suppression condition extraction unit 12 extracts the minimum value and the maximum value of the adjustable dimension in this continuous section, as the adjustable dimension start point (LS) and the adjustable dimension end point (LE), respectively.

The suppression condition extraction unit 12 calculates the adjusted adjustable dimension for suppressing the performance degradation due to a conflict miss. For example, the suppression condition extraction unit 12 extracts an adjustable dimension K that is greater than the adjustable dimension end point (LE) and for which the computation performance is greater than or equal to the threshold B(PT-B). By using the extracted adjustable dimension, the suppression condition extraction unit 12 calculates the adjusted adjustable dimension (LA) based on Equation (4) below. LAR in Equation (4) represents the number of rounding elements. MOD represents a remainder calculation.

$$LA = \text{Adjustable Dimension } K + LAR - \text{MOD(Adjustable Dimension } K, LAR) \qquad \text{Equation (4)}$$

For example, in the case where the adjustable dimension K is 1230 and the LAR is 100, the adjusted adjustable dimension LA is calculated to be 1300 by rounding the hundred's place. For example, in the case where the adjustable dimension is between the adjustable dimension start point (LS) and the adjustable dimension end point (LE), the adjustable dimension is adjusted to the adjusted adjustable dimension LA.

The suppression condition extraction unit 12 stores the adjustable dimension start point (LS), the adjustable dimension end point (LE), and the adjusted adjustable dimension (LA) in the suppression condition information 22 in association with one another.

Figure 5:
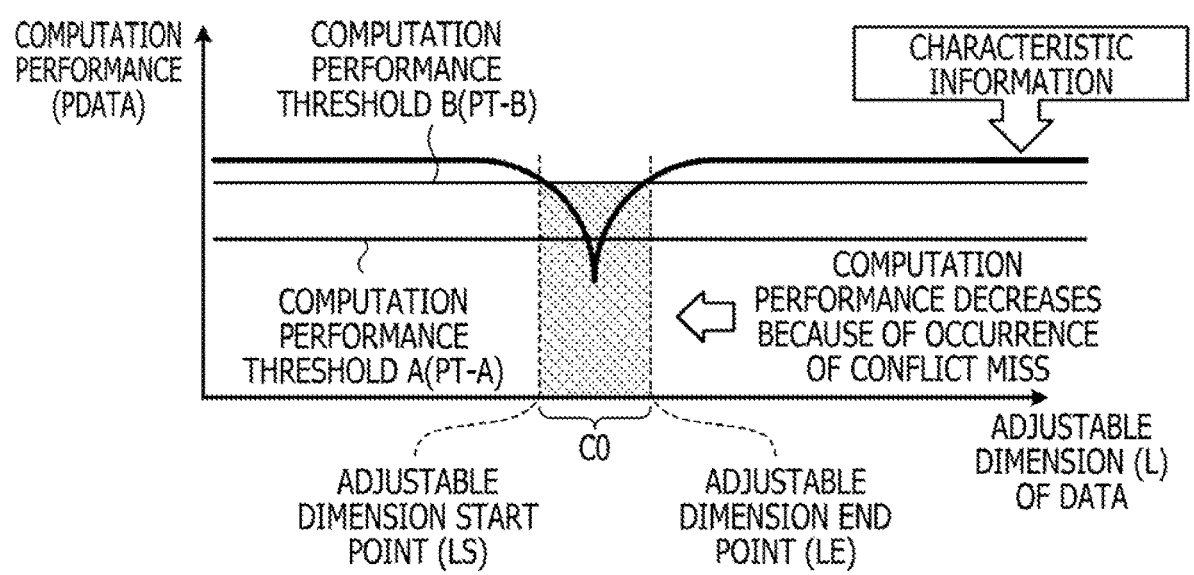
FIG. 5 is a diagram for describing extraction of a suppression condition according to the embodiment.

Extraction of a suppression condition will be described with reference to FIG. 5. FIG. 5 is a diagram for describing extraction of a suppression condition according to the embodiment. FIG. 5 illustrates the characteristic information 21 as a graph.

Based on the characteristic information 21, the suppression condition extraction unit 12 calculates the threshold A(PT-A) for determining a conflict miss and the threshold B(PT-B) for determining the occurrence of performance degradation. The threshold A(PT-A) and the threshold B(PT-B) are calculated based on the computation performance reference value PB. The threshold A(PT-A) and the threshold B(PT-B) are illustrated in the graph of the characteristic information 21.

The suppression condition extraction unit 12 extracts the minimum value of the adjustable dimension as the adjustable dimension start point (LS) in the continuous section of the adjustable dimension for which the computation performance is less than or equal to the threshold PT-B and which includes the adjustable dimension for which the computation performance is less than or equal to the threshold PT-A. The suppression condition extraction unit 12 extracts the maximum value of the adjustable dimension as the adjustable dimension end point (LE) in the continuous section of the adjustable dimension for which the computation performance is less than or equal to the threshold PT-B and which includes the adjustable dimension for which the computation performance is less than or equal to the threshold PT-A. The continuous section of the adjustable dimension is a continuous section represented by a reference sign C0. Such a continuous section is a section in which the computation performance decreases because of the occurrence of a conflict miss. A minimum value of the continuous section represented by the reference sign C0 is the adjustable dimension start point (LS). A maximum value of the continuous section represented by the reference sign C0 is the adjustable dimension end point (LE).

The suppression condition extraction unit 12 extracts the adjustable dimension K that is greater than the adjustable dimension end point (LE) and for which the computation performance is greater than or equal to the threshold B(PT-B). The suppression condition extraction unit 12 calculates the adjusted adjustable dimension LA by rounding the extracted adjustable dimension K by a predetermined number of elements.

Referring back to FIG. 1, the insertion unit 13 inserts an adjustable dimension setting block based on the suppression condition information 22 into a target program to be executed by the microprocessor in order to adjust the adjustable dimension used in this program. For example, the insertion unit 13 inserts a block for setting the adjustable dimension, immediately before a data definition in source code of the target program.

Figure 6:
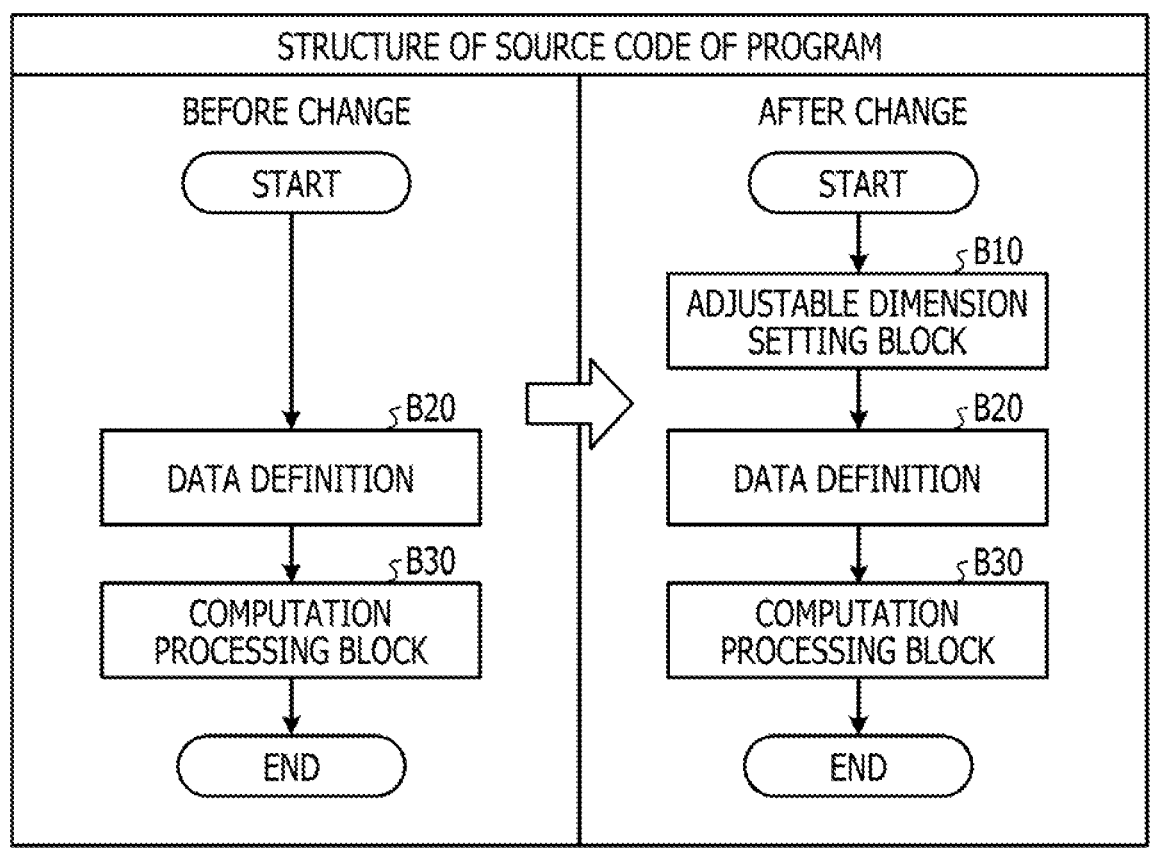
FIG. 6 is a diagram for describing insertion processing according to the embodiment.

Insertion processing performed by the insertion unit 13 will be described with reference to FIG. 6. FIG. 6 is a diagram for describing the insertion processing according to the embodiment. As illustrated in a left diagram of FIG. 6, a data definition B20 and a computation processing block B30 are coded in this order as the structure of source code of a program. As illustrated in a right diagram of FIG. 6, the insertion unit 13 inserts an adjustable dimension setting block B10 immediately before the data definition B20. For example, the inserted adjustable dimension setting block is coded based on the suppression condition information 22 such that the adjustable dimension for which the computation performance presumably decreases because of the occurrence of a conflict miss is changed to an adjustable dimension for suppressing the occurrence of a conflict miss.

Referring back to FIG. 1, the translation unit 14 translates (compiles) the target program in which the adjustable dimension has been adjusted.

[Flowchart of Adjustment Processing]

Figure 7:
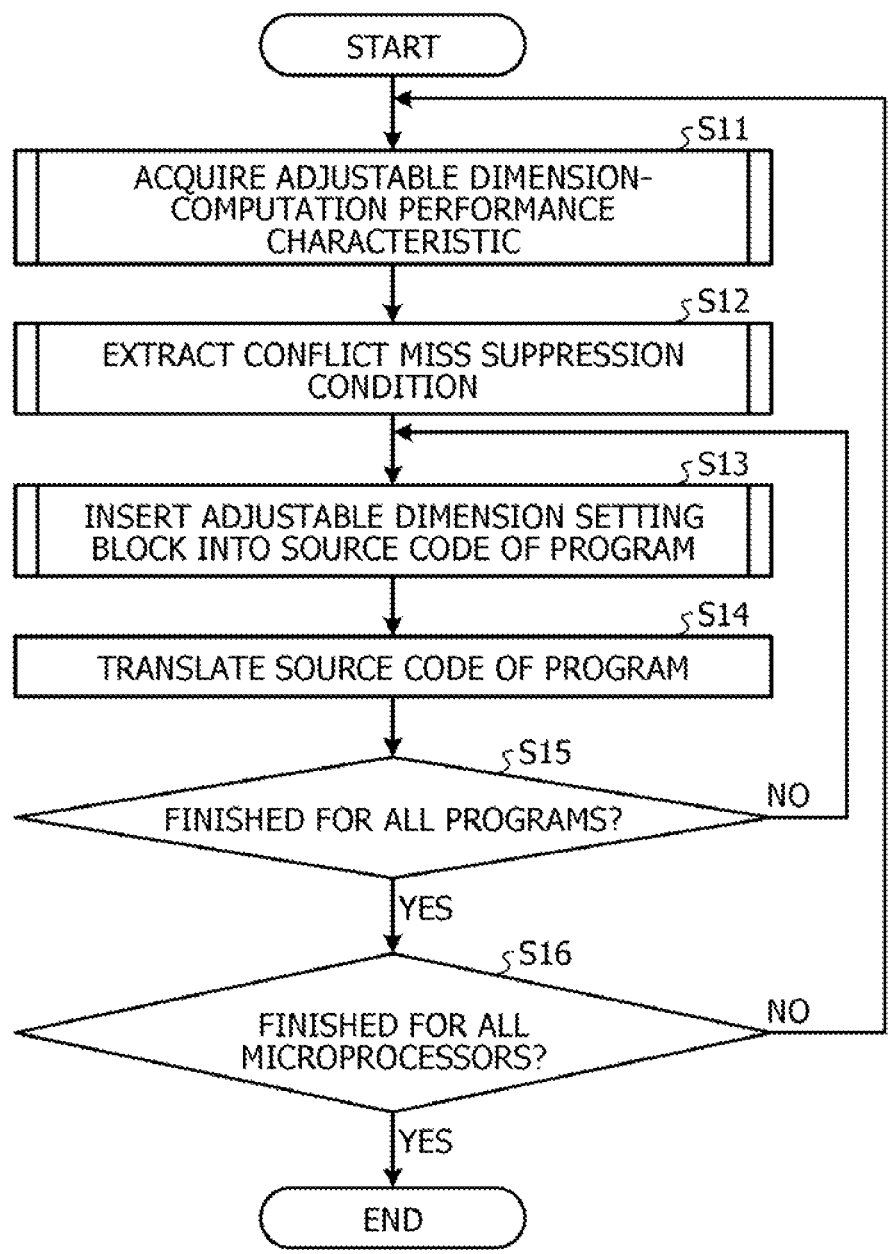
FIG. 7 is a diagram illustrating an example of an overall flow of adjustment processing according to the embodiment.

An example of a flowchart of adjustment processing according to the embodiment will be described with reference to FIGS. 7 to 12B. FIG. 7 is a diagram illustrating an example of an overall flow of the adjustment processing according to the embodiment. As illustrated in FIG. 7, in the adjustment processing, a characteristic indicating a relationship between the adjustable dimension and the computation performance (hereinafter, also referred to as an "adjustable dimension-computation performance characteristic") is acquired (step S11). A flowchart of characteristic acquisition processing for acquiring the adjustable dimension-computation performance characteristic will be described later.

In the adjustment processing, a conflict miss suppression condition is extracted (step S12). A flowchart of suppression condition extraction processing for extracting a conflict miss suppression condition will be described later.

In the adjustment processing, an adjustable dimension setting block is inserted into source code of a target program (step S13). A flowchart of processing of an adjustable dimension setting block will be described later. In the adjustment processing, the source code of the target program is translated (step S14).

In the adjustment processing, it is determined whether or not the insertion processing and the translation processing have been performed for all the programs (step S15). If it is determined that the insertion processing and the translation processing have not been performed for all the programs (No in step S15), the adjustment processing returns to step S13 to perform the insertion processing and the translation processing for the next program.

On the other hand, if it is determined that the insertion processing and the translation processing have been performed for all the programs (Yes in step S15), it is determined whether or not the adjustment processing has been performed for all the microprocessors (step S16). If it is determined that the adjustment processing has not been performed for all the microprocessors (No in step S16), the adjustment processing returns to step S11 to perform the adjustment processing for the next microprocessor.

On the other hand, if it is determined that the adjustment processing has been performed for all the microprocessors (Yes in step S16), the adjustment processing ends.

Figure 8:
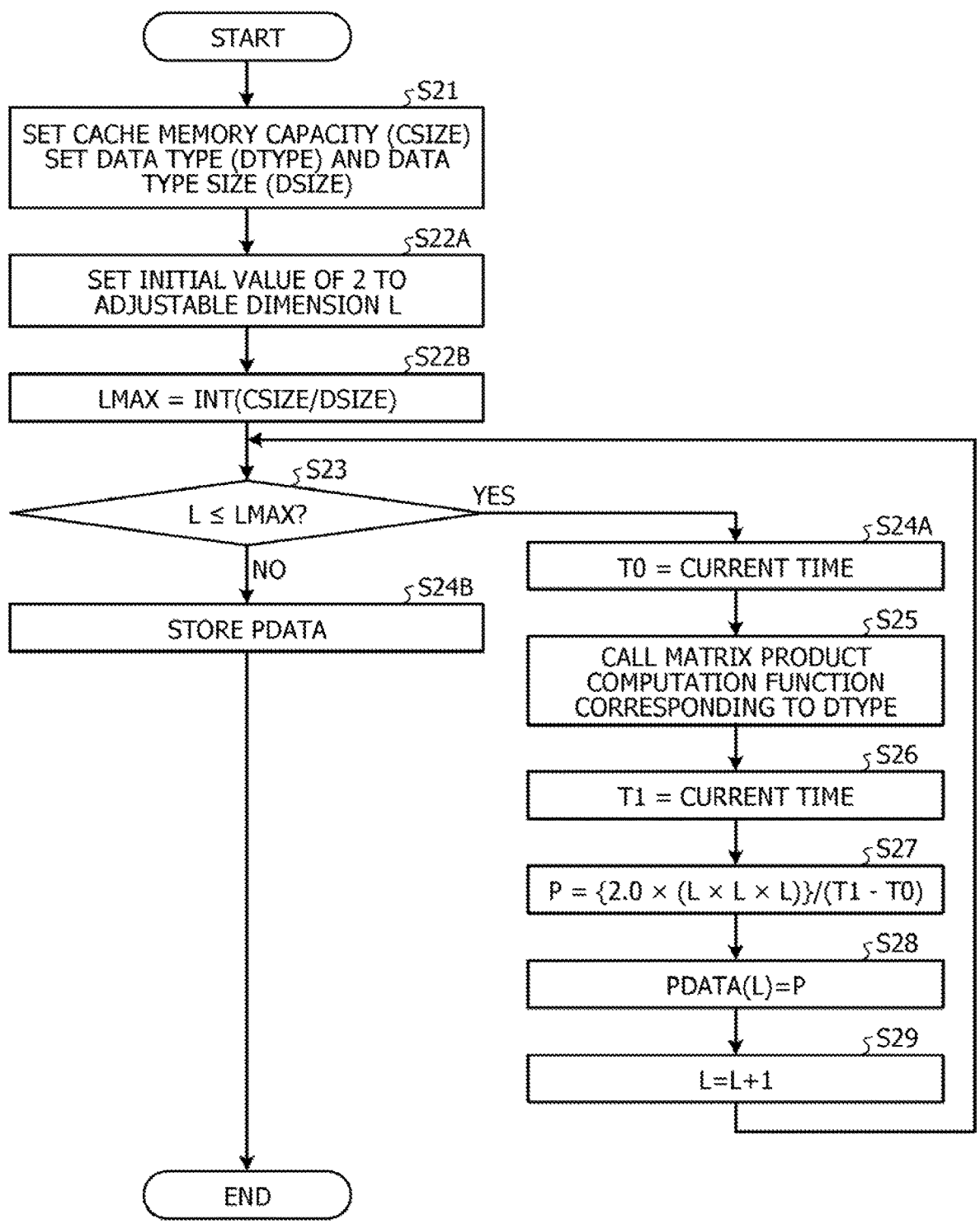
FIG. 8 is a diagram illustrating an example of a flowchart of characteristic acquisition processing according to the embodiment.

FIG. 8 is a diagram illustrating an example of a flowchart of the characteristic acquisition processing according to the embodiment. As illustrated in FIG. 8, the characteristic acquisition unit 11 sets a capacity of a cache memory mounted in a target microprocessor and a data type size of a data type DTYPE in storage areas CSIZE and DSIZE, respectively (step S21). An example of the data type DTYPE is a double-precision floating-point type. A data type size of the double-precision floating-point type is 8 bytes.

The characteristic acquisition unit 11 sets "2" as the initial value of the adjustable dimension L (step S22A). The characteristic acquisition unit 11 calculates a value of a quotient by dividing the cache memory capacity CSIZE by the data type size DSIZE, and sets the obtained value as the maximum value LMAX of the adjustable dimension (step S22B).

The characteristic acquisition unit 11 determines whether or not the adjustable dimension L is less than or equal to the maximum value LMAX of the adjustable dimension (step S23). If it is determined that the adjustable dimension L is less than or equal to the maximum value LMAX of the adjustable dimension (Yes in step S23), the characteristic acquisition unit 11 sets the current time to T0 (step S24A). The characteristic acquisition unit 11 calls a matrix product computation function that corresponds to the data type DTYPE and has the adjustable dimension L as an argument (step S25).

After the processing returns from the called function, the characteristic acquisition unit 11 sets the current time to T1 (step S26). The characteristic acquisition unit 11 calculates a computation performance P based on Equation (5) below (step S27).

$$P=\{2.0\times(L\times L\times L)\}(T1-T0) \qquad \text{Equation (5)}$$

The characteristic acquisition unit 11 sets the computation performance P for the adjustable dimension L to PDATA(L) (step S28). The characteristic acquisition unit 11 adds 1 to the adjustable dimension L (step S29). The processing returns to step S23 so that the characteristic acquisition unit 11 calculates the computation performance P for the next adjustable dimension L.

If it is determined in step S23 that the adjustable dimension L is greater than the maximum value LMAX of the adjustable dimension (No in step S23), the characteristic acquisition unit 11 stores PDATA (step S24B). PDATA is the characteristic information 21 indicating a relationship between the adjustable dimension and the computation performance. The characteristic acquisition unit 11 then ends the characteristic acquisition processing.

Figure 9:
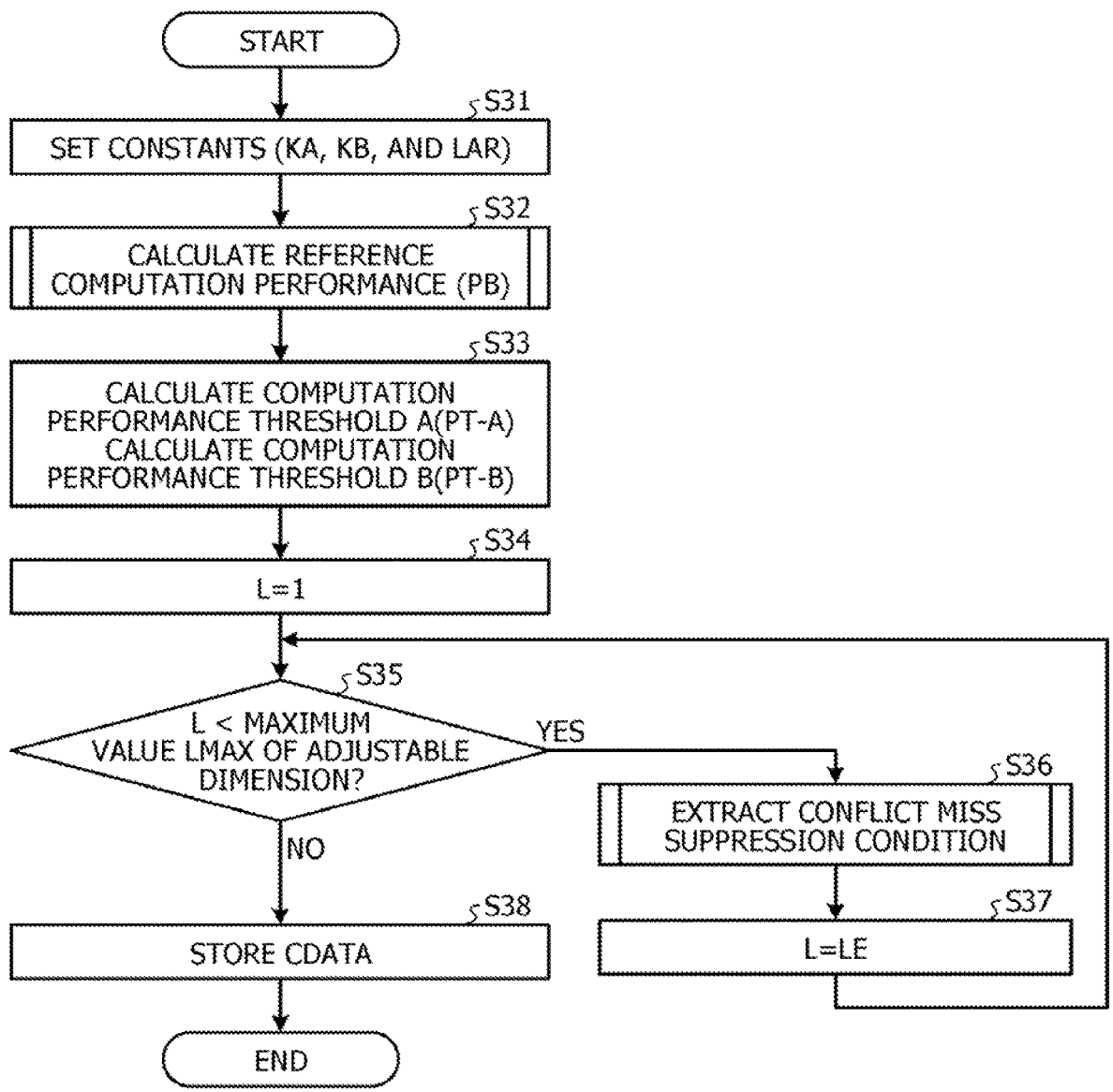
FIG. 9 is a diagram illustrating an example of a flowchart of suppression condition extraction processing according to the embodiment.

FIG. 9 is a diagram illustrating an example of a flowchart of the suppression condition extraction processing according to the embodiment. As illustrated in FIG. 9, the suppression condition extraction unit 12 sets the positive real number value KA used in determining the computation performance threshold A(PT-A), the positive real number value KB (>KA) used in determining the computation performance threshold B(PT-B), and the number of rounding elements LAR (step S31).

The suppression condition extraction unit 12 calculates the reference computation performance (PB) (step S32). A flowchart of reference computation performance calculation processing will be described later.

By using the reference computation performance (PB), the suppression condition extraction unit 12 calculates the computation performance threshold A(PT-A) and the reference performance threshold B(PT-B) (step S33). For example, the suppression condition extraction unit 12 multiplies the reference computation performance (PB) by the real number value KA, and determines the value obtained by the multiplication as the reference performance threshold A(PT-A) (see Equation (2)). The suppression condition extraction unit 12 multiplies the reference computation performance (PB) by the real number value KB, and determines the value obtained by the multiplication as the reference performance threshold B(PT-B) (see Equation (3)).

Subsequently, the suppression condition extraction unit 12 sets 1 as the adjustable dimension L (step S34).

The suppression condition extraction unit 12 determines whether or not the adjustable dimension L is less than the maximum value LMAX of the adjustable dimension (step S35). If it is determined that the adjustable dimension L is less than the maximum value LMAX of the adjustable dimension (Yes in step S35), the suppression condition extraction unit 12 extracts a conflict miss suppression condition for the adjustable dimension L (step S36). A flowchart of conflict miss suppression condition extraction processing will be described later.

The suppression condition extraction unit 12 sets the adjustable dimension end point LE to the next adjustable dimension L (step S37). The processing then returns to step S35 so that the suppression condition extraction unit 12 extracts the conflict miss suppression condition for the next adjustable dimension L.

On the other hand, if it is determined that the adjustable dimension L is greater than or equal to the maximum value LMAX of the adjustable dimension (No in step S35), the suppression condition extraction unit 12 stores the conflict miss suppression condition CDATA in the suppression condition information 22 (step S38). The suppression condition extraction unit 12 then ends the suppression condition extraction processing.

Figure 10:
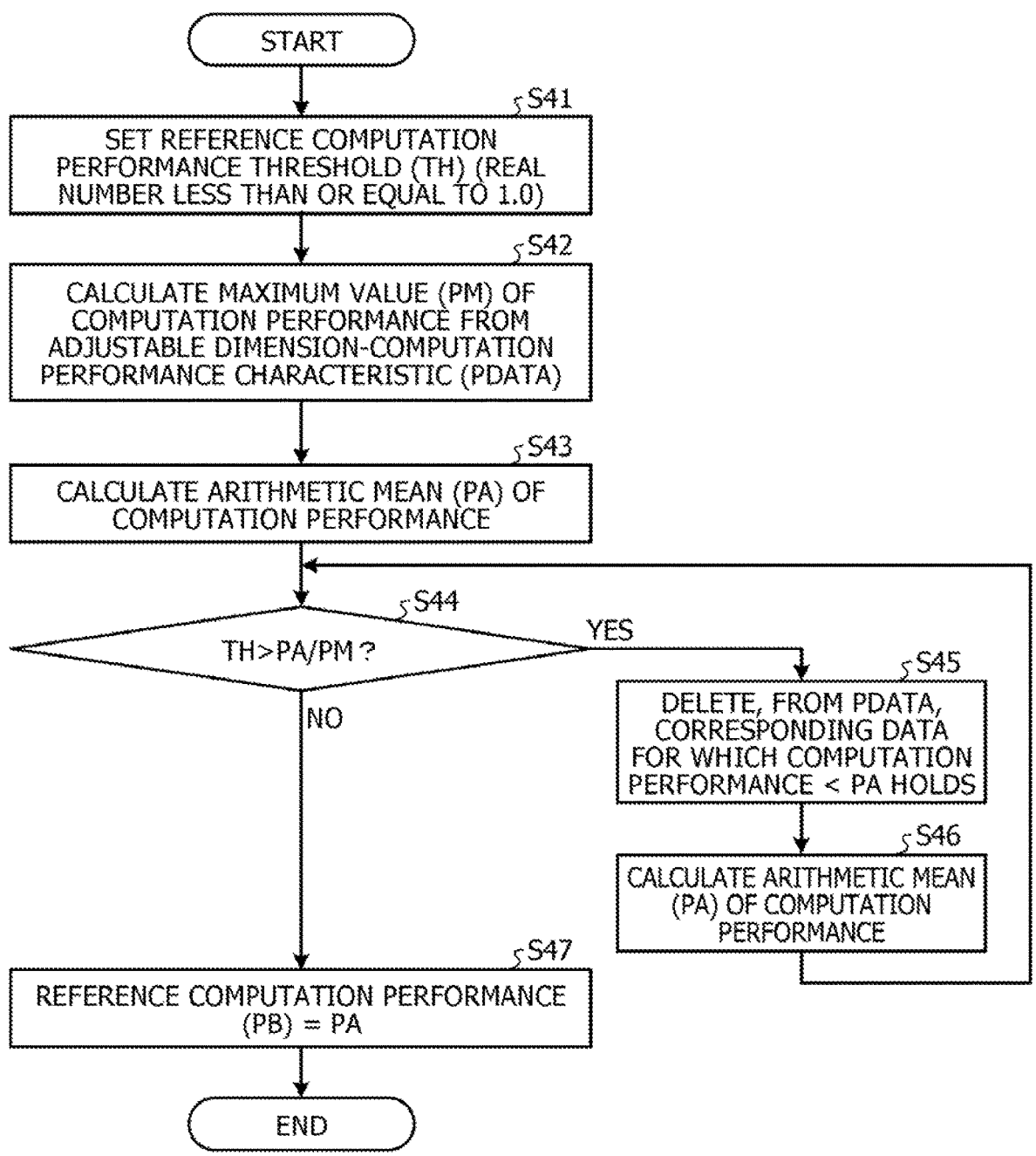
FIG. 10 is a diagram illustrating an example of a flowchart of reference computation performance calculation processing.

FIG. 10 is a diagram illustrating an example of a flowchart of the reference computation performance calculation processing. As illustrated in FIG. 10, the suppression condition extraction unit 12 sets a threshold TH used for determining the reference computation performance PB (step S41). TH is a real number value less than or equal to 1.0. Based on the characteristic information 21 (PDATA) indicating the relationship between the adjustable dimension and the computation performance, the suppression condition extraction unit 12 calculates a maximum value PM of the computation performance (step S42).

The suppression condition extraction unit 12 calculates an arithmetic mean PA of the computation performances (step S43). The suppression condition extraction unit 12 determines whether or not the threshold TH is greater than PA/PM (step S44). If it is determined that the threshold TH is greater than PA/PM (Yes in step S44), the suppression condition extraction unit 12 deletes, from the characteristic information 21 (PDATA), the corresponding data for which the computation performance is less than the arithmetic mean PA (step S45). For example, the suppression condition extraction unit 12 filters out the corresponding data for which the computation performance is less than the arithmetic mean PA.

The suppression condition extraction unit 12 calculates the arithmetic mean PA of the computation performances (step S46). The processing then returns to step S44 so that the suppression condition extraction unit 12 determines PA/PM again.

On the other hand, if it is determined that the threshold TH is less than or equal to PA/PM (No in step S44), the suppression condition extraction unit 12 sets the arithmetic mean PA of the computation performances as the reference computation performance PB (step S47). The suppression condition extraction unit 12 then ends the reference computation performance calculation processing.

Figure 11A:
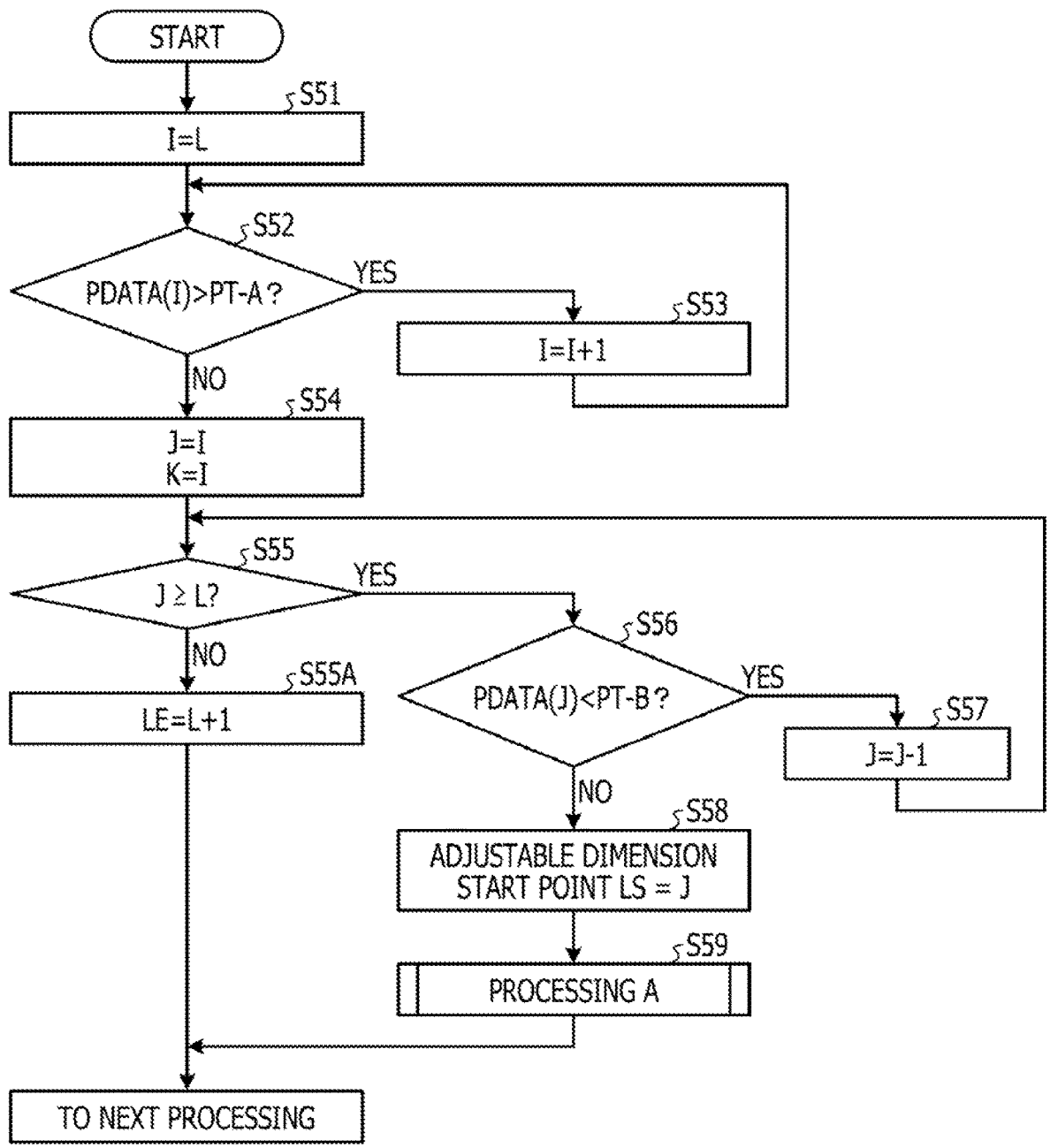
FIG. 11A is a diagram (part 1) illustrating an example of a flowchart of conflict miss suppression condition extraction processing.
Figure 11B:
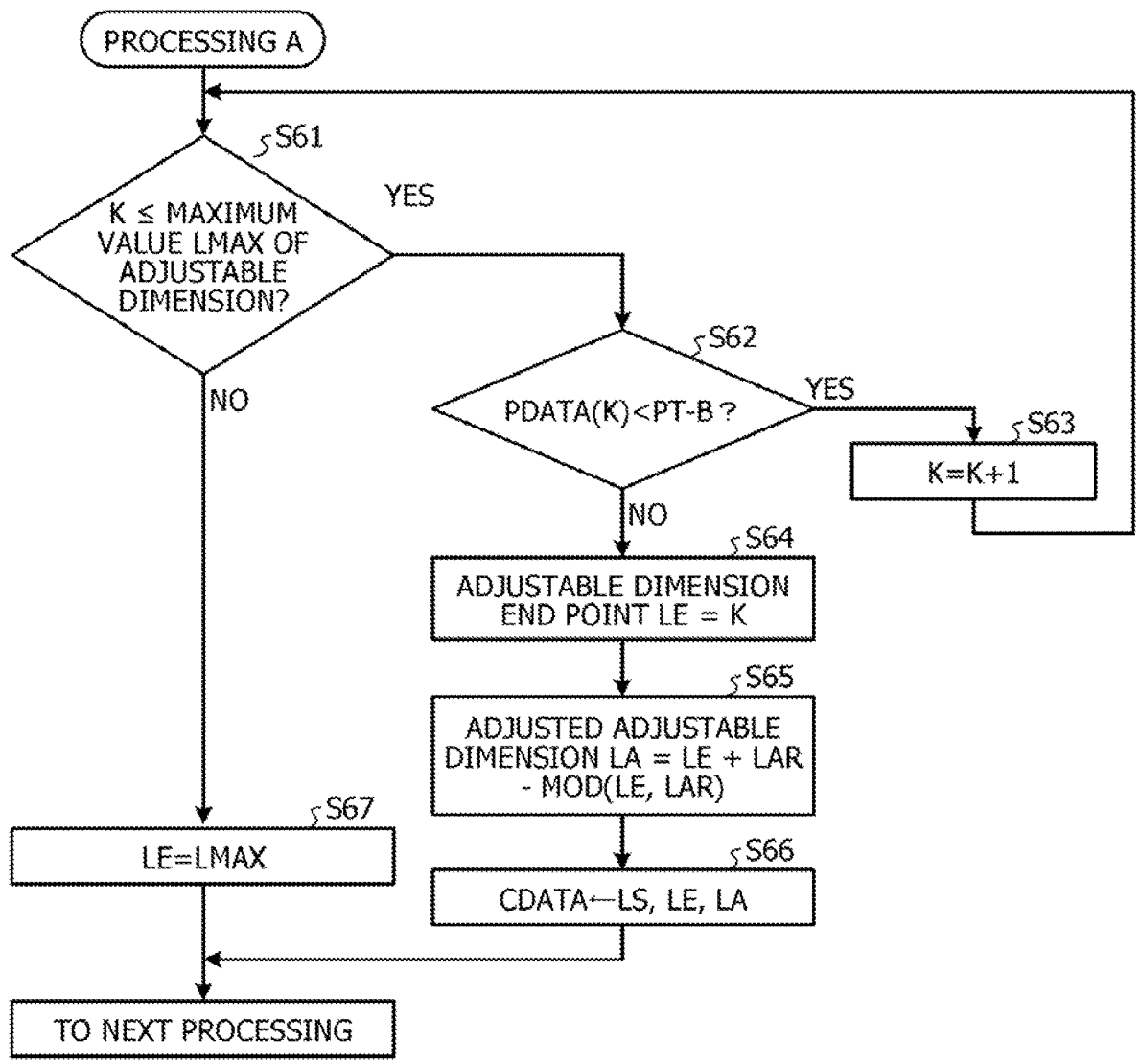
FIG. 11B is a diagram (part 2) illustrating an example of a flowchart of the conflict miss suppression condition extraction processing.

FIGS. 11A and 11B are diagrams illustrating an example of a flowchart of the conflict miss suppression condition extraction processing.

As illustrated in FIG. 11A, the suppression condition extraction unit 12 sets the adjustable dimension L in I defined as a storage area (step S51). The adjustable dimension L in this case is a starting adjustable dimension for determining one suppression condition. The suppression condition extraction unit 12 determines whether or not a computation performance PDATA(I) corresponding to the adjustable dimension I is greater than the computation performance threshold A(PT-A) (step S52). If it is determined that the computation performance PDATA(I) is greater than the computation performance threshold A(PT-A) (Yes in step S52), the suppression condition extraction unit 12 adds 1 to the adjustable dimension I (step S53). The suppression condition extraction unit 12 causes the processing to return to step S52.

On the other hand, if it is determined that the computation performance PDATA(I) is less than or equal to the computation performance threshold A(PT-A) (No in step S52), the suppression condition extraction unit 12 sets the adjustable dimension I for which the computation performance PDATA (I) becomes less than or equal to PT-A, in J and K defined as storage areas (step S54). The suppression condition extraction unit 12 determines whether or not the adjustable dimension J is greater than or equal to the starting adjustable dimension L (step S55). If it is determined that the adjustable dimension J is less than the starting adjustable dimension L (No in step S55), the suppression condition extraction unit 12 sets the adjustable dimension L+1 as the adjustable dimension end point LE (step S55A). The processing then returns to the call source so that the suppression condition extraction unit 12 performs the next processing.

On the other hand, if it is determined that the adjustable dimension J is greater than or equal to the starting adjustable dimension L (Yes in step S55), the suppression condition extraction unit 12 determines whether or not the computation performance PDATA(J) corresponding to the adjustable dimension J is less than the computation performance threshold B(PT-B) (step S56). If it is determined that the computation performance PDATA(J) is less than the computation performance threshold B(PT-B) (Yes in step S56), the suppression condition extraction unit 12 subtracts 1 from the adjustable dimension J (step S57). The suppression condition extraction unit 12 causes the processing to return to step S55.

On the other hand, if it is determined that the computation performance PDATA(J) is greater than or equal to the computation performance threshold B(PT-B) (No in step S56), the suppression condition extraction unit 12 sets the adjustable dimension J as the adjustable dimension start point LS (step S58). The suppression condition extraction unit 12 performs processing A to calculate the adjustable dimension end point (step S59). After performing the processing A, the processing returns to the call source so that the suppression condition extraction unit 12 performs the next processing.

As illustrated in FIG. 11B, in the processing A, it is determined whether or not K is less than or equal to the maximum value LMAX of the adjustable dimension (step S61). K in this case is a value, to which the adjustable dimension I for which the computation performance PDATA (I) becomes less than or equal to PT-A is set. If it is determined that K is less than or equal to the maximum value LMAX of the adjustable dimension (Yes in step S61), it is determined whether or not the computation performance PDATA(K) corresponding to the adjustable dimension K is less than the computation performance threshold B(PT-B) in the processing A (step S62).

If it is determined that the computation performance PDATA(K) is less than the computation performance threshold B(PT-B) (Yes in step S62), 1 is added to the adjustable dimension K in the processing A (step S63). The processing A then returns to step S61.

On the other hand, if it is determined that the computation performance PDATA(K) is greater than or equal to the computation performance threshold B(PT-B) (No in step S62), the current adjustable dimension K is set in LE as the adjustable dimension end point in the processing A (step S64). In addition, in the processing A, a value obtained by adding the number of rounding elements LAR to LE set as the adjustable dimension end point and then subtracting MOD(LE, LAR) from the sum is set as the adjusted adjustable dimension LA (step S65). In the processing A, the adjustable dimension start point LS, the adjustable dimension end point LE, and the adjusted adjustable dimension LA are set in association with one another in the conflict miss suppression condition information 22 (CDATA) (step S66). The processing A then returns to the call source.

In step S61, if it is determined that K is greater than the maximum value LMAX of the adjustable dimension (No in step S61), the maximum value LMAX of the adjustable dimension is set as the adjustable dimension end point LE in processing A (step S67). The processing A then returns to the call source.

Figure 12A:
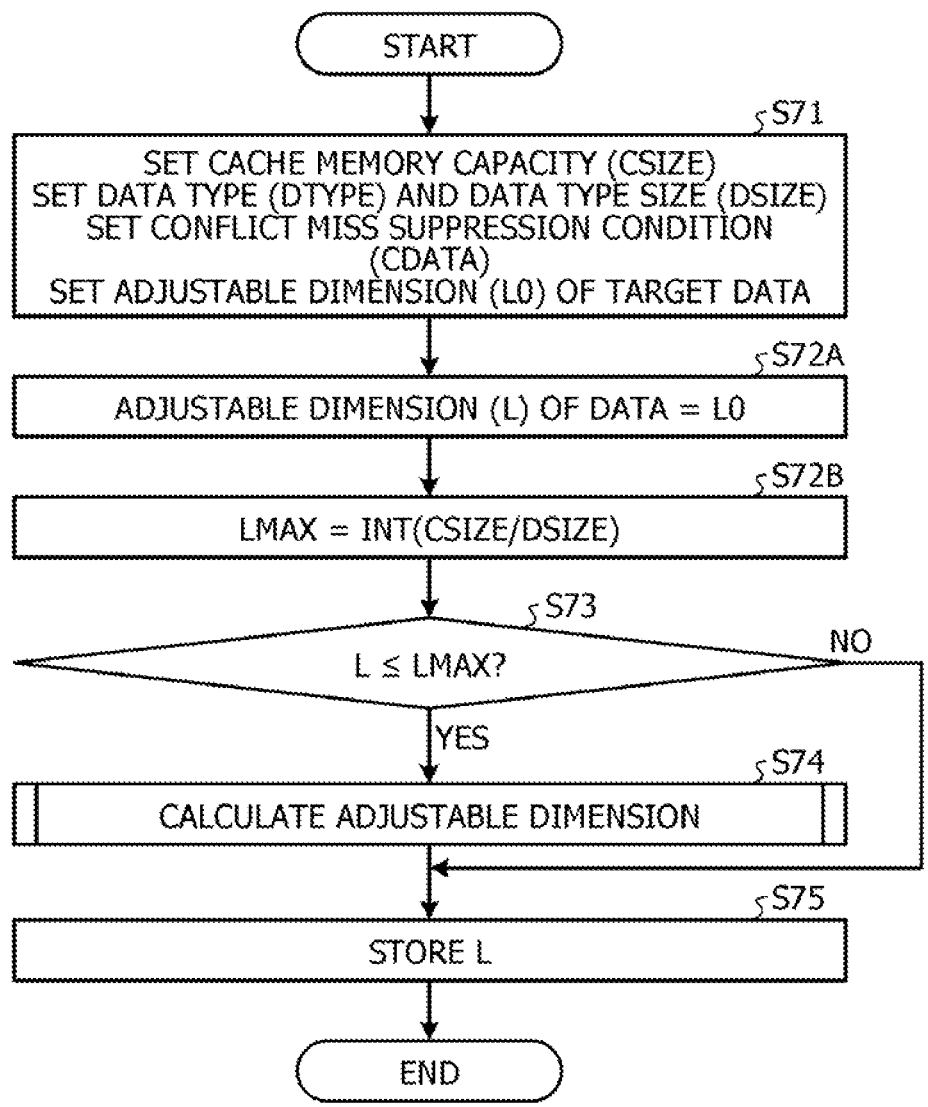
FIG. 12A is a diagram (part 1) illustrating an example of a flowchart of processing of an adjustable dimension setting block according to the embodiment.
Figure 12B:
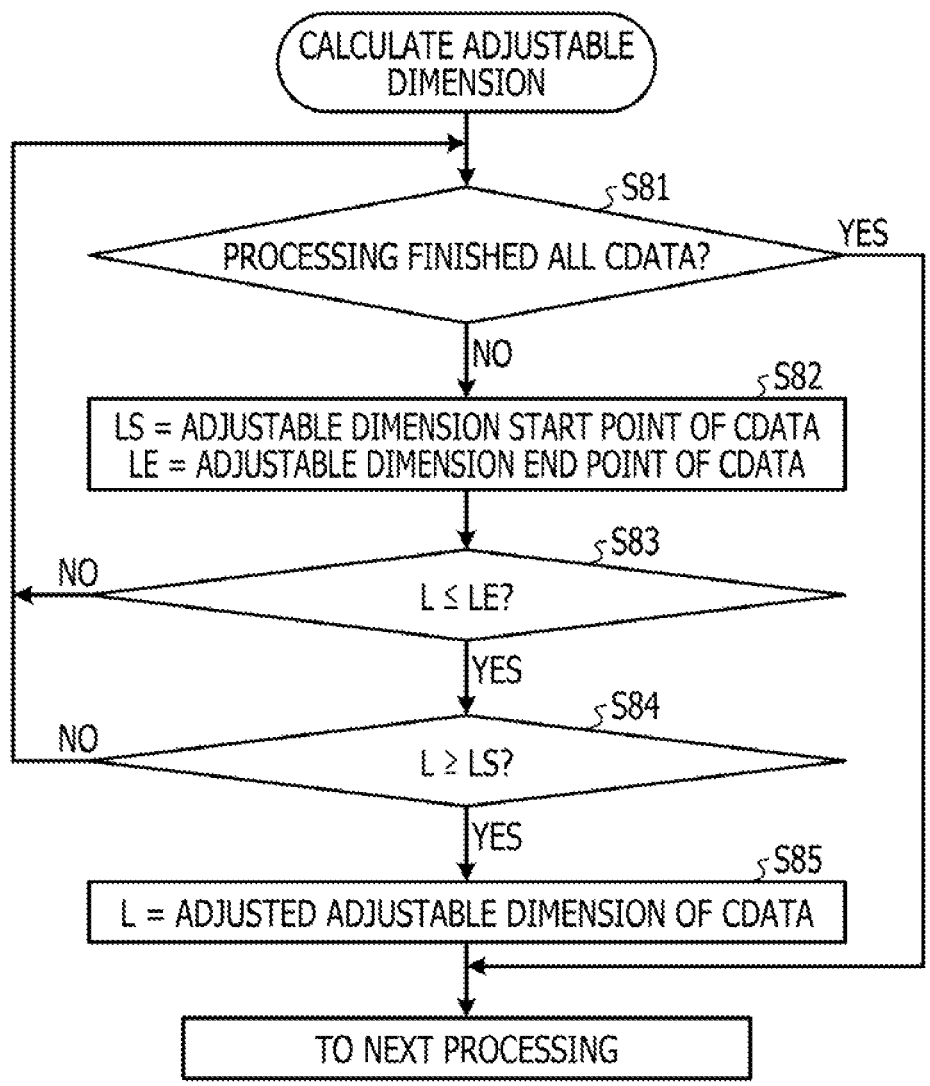
FIG. 12B is a diagram (part 2) illustrating an example of a flowchart of the processing of the adjustable dimension setting block according to the embodiment.

FIGS. 12A and 12B are diagrams illustrating an example of a flowchart of processing of an adjustable dimension setting block according to the embodiment. The processing of the adjustable dimension setting block is processing performed after the adjustable dimension setting block is inserted into the target program. Description will be given on the assumption that an adjustable dimension LO of target data is a target to be adjusted.

As illustrated in FIG. 12A, the insertion unit 13 sets the capacity of the cache memory mounted in the target microprocessor and the data type size of the data type DTYPE in the storage areas CSIZE and DSIZE, respectively. In addition, the insertion unit 13 sets the conflict miss suppression condition information 22 (CDATA) and the adjustable dimension LO of the target data (step S71). An example of the data type DTYPE is a double-precision floating-point type. A data type size of the double-precision floating-point type is 8 bytes.

The insertion unit 13 sets the adjustable dimension LO of the target data to the adjustable dimension L (step S72A). The insertion unit 13 calculates an integer of a quotient by dividing the cache memory capacity CSIZE by the data type size DSIZE, and sets the obtained value as the maximum value LMAX of the adjustable dimension (step S72B).

The insertion unit 13 determines whether or not the adjustable dimension L of the data is less than or equal to the maximum value LMAX of the adjustable dimension (step S73). If it is determined that the adjustable dimension L of data is not less than or equal to the maximum value LMAX of the adjustable dimension (No in step S73), the insertion unit 13 causes the processing to proceed to step S75.

On the other hand, if it is determined that the adjustable dimension L of data is less than or equal to the maximum value LMAX of the adjustable dimension (Yes in step S73), the insertion unit 13 performs adjustable dimension calculation processing (step S74). A flowchart of the adjustable dimension calculation processing will be described later. After the insertion unit 13 performs the adjustable dimension calculation processing, the processing proceeds to step S75.

In step S75, the insertion unit 13 stores the adjustable dimension L of the target data (step S75). The insertion unit 13 then ends the processing of the adjustable dimension setting block.

As illustrated in FIG. 12B, in the adjustable dimension calculation processing (hereafter abbreviated as calculation processing), it is determined whether or not processing has been finished for all the conflict miss suppression conditions CDATA (suppression condition information 22) (step S81). If it is determined that processing has not been finished for all the conflict miss suppression conditions CDATA (No in step S81), the adjustable dimension start point of CDATA is set as LS and the adjustable dimension end point of CDATA is set as LE in the calculation processing (step S82).

In the calculation process, it is determined whether or not the adjustable dimension L of the target data is less than or equal to the adjustable dimension end point LE (step S83). If it is determined that the adjustable dimension L of the target data is not less than or equal to the adjustable dimension end point LE (No in step S83), the calculation processing returns to step S81 to process the next CDATA. This is because, in such a case, the adjustable dimension L of the target data does not meet the current suppression condition.

On the other hand, if it is determined that the adjustable dimension L of the target data is less than or equal to the adjustable dimension end point LE (Yes in step S83), it is determined whether or not the adjustable dimension L of the target data is greater than or equal to the adjustable dimension start point LS in the calculation processing (step S84). If it is determined that the adjustable dimension L of the target data is not greater than or equal to the adjustable dimension start point LS (No in step S84), the calculation processing returns to step S81 to process the next CDATA.

This is because, in such a case, the adjustable dimension L of the target data does not meet the current suppression condition.

On the other hand, if it is determined that the adjustable dimension L of the target data is greater than or equal to the adjustable dimension start point LS (Yes in step S84), the adjusted adjustable dimension of CDATA is set as the adjustable dimension L of the target data in the calculation processing (step S85). The calculation processing then returns to the call source.

In step S81, if it is determined that processing has been finished for all the conflict miss suppression conditions CDATA (Yes in step S81), the calculation processing returns to the call source.

Specific Example of Adjustment Processing

A specific example of the adjustment processing according to the embodiment will now be described with reference to FIGS. 13 to 18. In FIGS. 13 to 18, a specific example for stabilizing the performance of a cache memory when OSS is executed will be described. OSS in this case indicates "Quantum ESPRESSO" (registered trademark), which is an integrated suite of open source computer codes for performing first-principles calculation for the purpose of electronic structure calculations and materials modeling at the nanoscale. A calculation method is based on density-functional theory, plane waves, and pseudopotentials.

FUJITSU Supercomputer PRIMEHPC FX1000 equipped with the A64FX processor (Arm-based processor) is used as the system environment. The execution environment is such that A64FX×1CPU and 4 processes×12 threads. The capacity (CSIZE) of a cache memory mounted in the processor is 64 KB. The data type (DTYPE) is the double-precision floating-point type, and the size (DSIZE) of the data type is 8 bytes. Because the data type is the double-precision floating-point type and the size of the data type is 8 bytes, LMAX is equal to 8192(=64×1024 bytes/8 bytes). The adjustable dimension (L) is from 8 to 8192 (LMAX), and a step width is 8.

Figure 13:
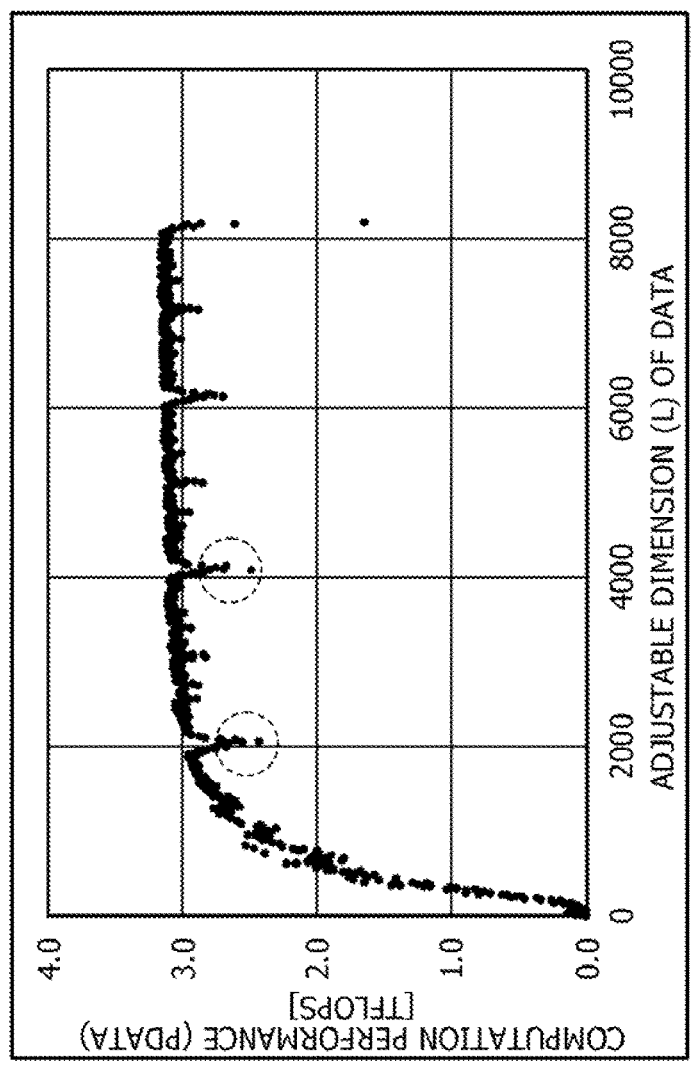
FIG. 13 is a diagram illustrating a specific example of the characteristic information according to the embodiment.

In such a circumstance, the characteristic acquisition unit 11 calculates the computation performance value corresponding to each adjustable dimension by executing the OSS that corresponds to the data type and uses each adjustable dimension as a parameter, and acquires characteristic information 21A. FIG. 13 is a diagram illustrating a specific example of the characteristic information according to the embodiment. A left diagram of FIG. 13 illustrates the characteristic information 21A. A right diagram in FIG. 13 illustrates the characteristic information 21A as a graph. As illustrated in the right diagram of FIG. 13, for example, in sections indicated by broken lines, the computation performance decreases because of the occurrence of a conflict miss in the cache memory.

By using the characteristic information 21A, the suppression condition extraction unit 12 extracts a suppression condition of the adjustable dimension for which a decrease in computation performance due to a conflict miss occurs. The suppression condition extraction unit 12 calculates the arithmetic mean of all the computation performances from the characteristic information 21A by using Equation (1) described above, and sets the obtained value as the computation performance reference value PB. Equation (11) below is the reference value PB calculated by substituting all the computation performances to Equation (1), and the reference value PB is 2.82 teraflops (TFLOPS).

$$PB = \frac{1}{N}\sum_{n=1}^{N}(PDATA_n) = \frac{1}{1024}\sum_{n=1}^{1024}(PDATA_n) = 2.82 TFLOPS \quad (11)$$

By using Equation (2) described above, the suppression condition extraction unit 12 calculates the threshold PT-A for determining a conflict miss based on the reference computation performance (PB). A case is assumed where KA is 0.9. A calculated example is as follows.

$PT\text{-}A=PB\times KA=2.82\times 0.9=2.54$

By using Equation (3) described above, the suppression condition extraction unit 12 calculates the threshold PT-B for determining the occurrence of performance degradation from the reference computation performance (PB). A case is assumed where KB is equal to 1.0. A calculated example is as follows.

$PT\text{-}B=PB\times KB=2.82\times 1.0=2.82$

In a continuous section of the adjustable dimension for which the computation performance is less than or equal to the threshold PT-B and which includes the adjustable dimension for which the computation performance is less than or equal to the threshold PT-A, the suppression condition extraction unit 12 sets the minimum value of the adjustable dimension as the adjustable dimension start point (LS) and the maximum value of the adjustable dimension as the adjustable dimension end point (LE). The suppression condition extraction unit 12 extracts the adjustable dimension K that is greater than the adjustable dimension end point (LE) and for which the computation performance is greater than or equal to the threshold B(PT-B). The adjustable dimension K is rounded by using the number of rounding elements (LAR) of 100, and the adjusted adjustable dimension LA is calculated.

FIG. 14 is a diagram illustrating a specific example of the suppression condition information according to the embodiment. As illustrated in FIG. 14, suppression condition information 22A in which the adjustable dimension start point (LS), the adjustable dimension end point (LE), and the adjusted adjustable dimension (LA) are associated with one another is presented. In the case where the adjustable dimension start point LS is "1992" and the adjustable dimension end point LE is "2096", "2200 (2104)" is stored as the adjusted adjustable dimension LA. The numerical value "2104" in parentheses is an adjustable dimension before rounding. For example, in the case where the adjustable dimension is from "1992" to "2096", the adjustable dimension is adjusted to the adjusted adjustable dimension "2200".

In the case where the adjustable dimension start point LS is "4080" and the adjustable dimension end point LE is "4128", "4200 (4136)" is stored as the adjusted adjustable dimension LA. The numerical value "4136" in parentheses is the adjustable dimension before rounding. For example, in the case where the adjustable dimension is from "4080" to "4128", the adjustable dimension is adjusted to the adjusted adjustable dimension "4200".

FIG. 15 is a diagram describing a specific example of insertion of the adjustable dimension setting block. In FIG. 15, a sample program in which the adjustable dimension is randomly selected in a section from 1900 to 2100 is created and presented. An adjustable dimension setting block $B10_A$ is inserted immediately before a data definition $B20_A$ in this sample program.

Based on the suppression condition information 22A, the adjustable dimension setting block B10$_A$ is coded in a following manner. For example, in the case where the adjustable dimension is greater than or equal to "1992" and less than or equal to "2096", coding is performed such that the adjustable dimension is adjusted to "2200". In the case where the adjustable dimension is greater than or equal to "4080" and less than or equal to "4128", coding is performed such that the adjustable dimension is adjusted to "4200". In the sample program, after the data definition B20$_A$ is performed with the adjustable dimension adjusted by the adjustable dimension setting block B10$_A$, the sample program proceeds to the processing of a computation processing block B30$_A$.

FIG. 16 illustrates an example of an execution result of the sample program. FIG. 16 illustrates the execution result obtained by executing the sample program in which the adjustable dimension setting block is inserted as illustrated in FIG. 15. The sample program in which the adjustable dimension setting block is inserted is translated by the translation unit 14 and is executed.

An elapsed time illustrated in FIG. 16 is a measured time of the progress of the entire program. As illustrated in FIG. 16, the elapsed time is 29.90 seconds for the source code of the original sample program. By contrast, for the source code in which the adjustable dimension setting block is inserted in the sample program, the elapsed time is 28.07 seconds. Thus, the performance is improved by about 6.1% (=(1.83/29.90)×100) from that of the original. For example, by inserting the adjustable dimension setting block into the original, the instability of the performance of the cache memory due to the occurrence of a conflict miss is improved, and consequently the entire elapsed time is improved by about 6.1%.

FIG. 17 is a diagram illustrating an execution result of the OSS. FIG. 17 illustrates the execution result of a program obtained by inserting the adjustable dimension setting block in part of a processing block of the OSS (Quantum ESPRESSO). The program in which the adjustable dimension setting block is inserted is translated by the translation unit 14 and executed.

An elapsed time illustrated in FIG. 17 is a measured time of the progress of the entire program. As illustrated in FIG. 17, the elapsed time is 0.68 seconds for the source code of the original program. By contrast, for the source code in which the adjustable dimension setting block is inserted in the program, the elapsed time is 0.64 seconds. Thus, the performance is improved by about 5.9% (=(0.04/0.68)×100) from that of the original. For example, by inserting the adjustable dimension setting block into the original, the instability of the performance of the cache memory due to the occurrence of a conflict miss is improved, and consequently the entire elapsed time is improved by about 5.9%.

Figure 18:
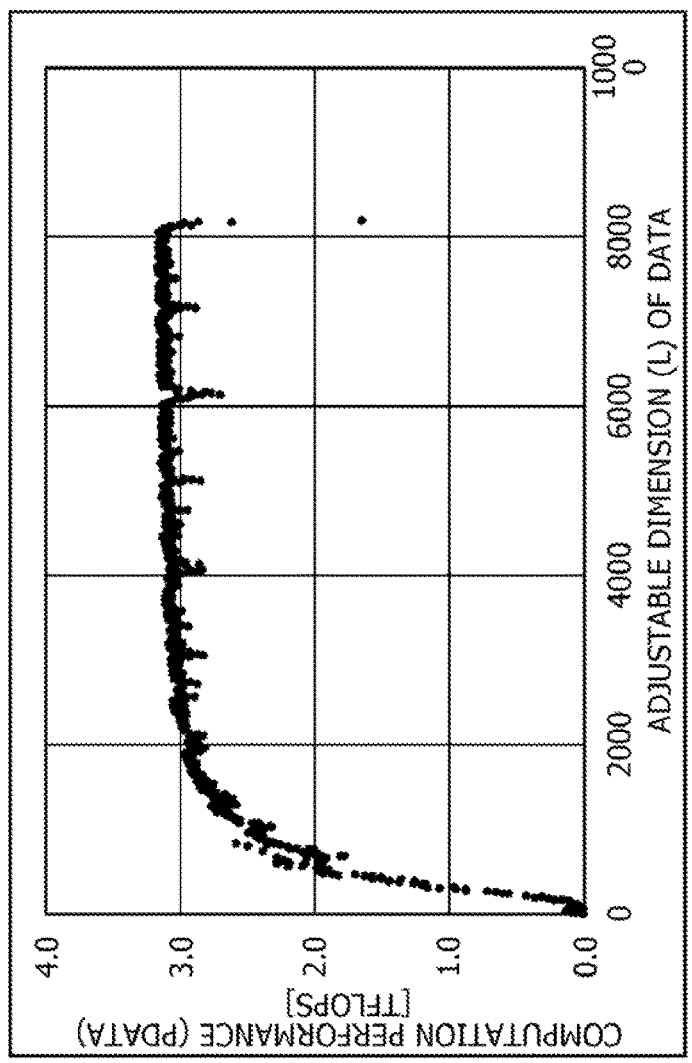
FIG. 18 is a diagram illustrating a specific example of the characteristic information after application.

FIG. 18 illustrates characteristic information obtained after the adjustment processing according to the embodiment is applied. FIG. 18 is a diagram illustrating a specific example of the characteristic information after application. In characteristic information 21B illustrated in FIG. 18, the computation performance is calculated by changing the adjustable dimension between the adjustable dimension start point (LS) and the adjustable dimension end point (LE) to the adjusted adjustable dimension (LA) based on the suppression condition information 22A. A left diagram of FIG. 18 illustrates the characteristic information 21B after application. A right diagram of FIG. 18 illustrates the characteristic information 21B as a graph. As compared with the right diagram FIG. 13, in the right diagram in FIG. 18, the section in which the computation performance decreases because of the occurrence of a conflict miss in the cache memory reduces.

As described above, the adjustment processing according to the embodiment may stabilize the performance of the cache memory by adjusting the adjustable dimension between the adjustable dimension start point (LS) and the adjustable dimension end point (LE) to the adjusted adjustable dimension (LA) for the target program.

Effects of Embodiment

According to the embodiment described above, the information processing apparatus 1 acquires the characteristic information 21 that indicates a computation performance value that corresponds to each adjustable dimension, through computation in which a cache memory in a processor that includes the cache memory is used. The information processing apparatus 1 extracts, by using the characteristic information 21, the suppression condition information 22 for adjusting an adjustable dimension for which a decrease in computation performance due to a cache miss caused by a cache-line conflict in the cache memory occurs. The information processing apparatus 1 inserts adjustment processing based on the suppression condition information 22 into a specific program that is executed by the processor and uses the adjustable dimension. Thus, the information processing apparatus 1 may stabilize the performance of the cache memory when the specific program is executed, by inserting the adjustment processing based on the suppression condition information 22 for adjusting the adjustable dimension into the specific program.

According to the embodiment described above, the information processing apparatus 1 acquires the characteristic information 21 through the computation in which an adjustable dimension is given and continuous addresses are sequentially accessed for data that has a certain data size. According to such a configuration, the information processing apparatus 1 may acquire the characteristic information 21 indicating the computation performance corresponding to the adjustable dimension, by using the calculation in which continuous accesses (sequential accesses to adjacent addresses) are performed with a certain data size.

According to the embodiment described above, the information processing apparatus 1 extracts, by using the characteristic information 21, a section of the adjustable dimension for which a decrease in computation performance occurs. The information processing apparatus 1 calculates an adjustable dimension that is greater than the adjustable dimension at an end point of the extracted section and for which the computation performance value is greater than or equal to a predetermined threshold. The information processing apparatus 1 extracts the suppression condition information 22 that includes the extracted section and the calculated adjustable dimension. According to such a configuration, the information processing apparatus 1 may adjust, by using the suppression condition information 22, the adjustable dimension in the case where a specific program is executed, and may stabilize the performance of the cache memory.

According to the embodiment described above, the information processing apparatus 1 extracts, by using an arithmetic mean of the computation performance value corresponding to each adjustable dimension, the section of the adjustable dimension for which a decrease in computation performance occurs. According to such a configuration, the information processing apparatus 1 may adjust the extracted section by extracting the section of the adjustable dimension for which a decrease in computation performance occurs.

[Others]

Unless otherwise specified, processing procedures, control procedures, specific names, and information including various kinds of data and parameters described in the above description or drawings may be changed in an arbitrary manner.

Each element of each illustrated apparatus is a functional concept, and does not necessarily be physically constituted as illustrated in the drawings. For example, the specific form of the distribution or integration of the individual apparatuses is not limited to that illustrated in the drawings. For example, the entirety or part of the apparatus may be constituted so as to be functionally or physically distributed or integrated in an arbitrary units in accordance with various kinds of loads, usage states, or the like.

All or arbitrary part of the processing functions performed by each apparatus may be implemented by a CPU and a program analyzed and executed by the CPU or may be implemented by hardware using wired logic.

Figure 19:
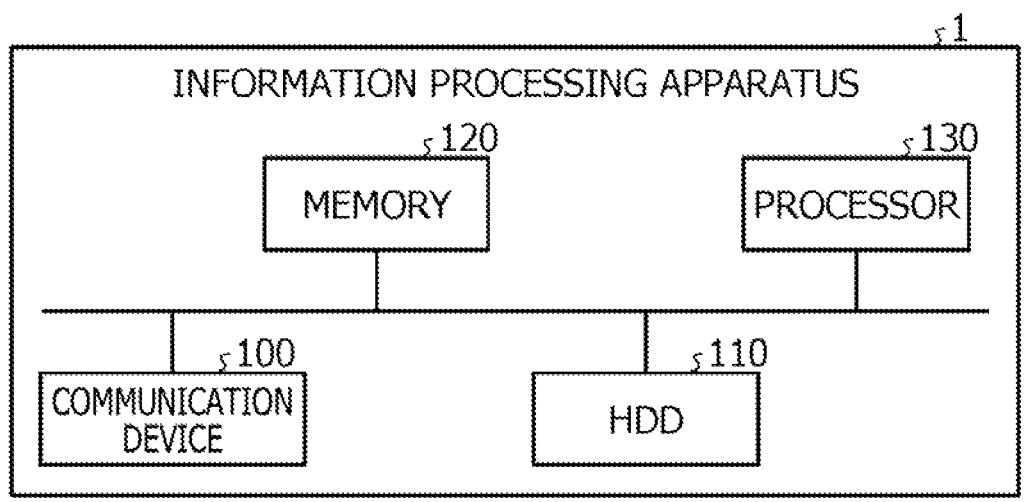
FIG. 19 is a diagram for describing an example of a hardware configuration.

FIG. 19 is a diagram for describing an example of a hardware configuration. As illustrated in FIG. 19, the information processing apparatus 1 includes a communication device 100, a hard disk drive (HDD) 110, a memory 120, and a processor 130. The communication device 100, the HDD 110, the memory 120, and the processor 130 illustrated in FIG. 19 are coupled to one another by a bus or the like.

The communication device 100 is a network interface card or the like, and communicates with another apparatus. The HDD 110 stores a program for causing the functional units illustrated in FIG. 1 to operate and stores a database (DB).

The processor 130 includes a cache memory. The processor 130 reads a program for executing processing similar to that of each processing unit illustrated in FIG. 1 from the HDD 110 or the like and loads the program into the memory 120, thereby causing a process for executing each function described with reference to FIG. 1 and the like to operate. For example, this process executes a function similar to that of each processing unit included in the information processing apparatus 1. For example, the processor 130 reads, from the HDD 110 or the like, a program having functions similar to those of the characteristic acquisition unit 11, the suppression condition extraction unit 12, the insertion unit 13, the translation unit 14, and the like. The processor 130 then executes processes for executing substantially the same processing as that of the characteristic acquisition unit 11, the suppression condition extraction unit 12, the insertion unit 13, the translation unit 14, and the like.

As described above, the information processing apparatus 1 operates as an information processing apparatus that performs an adjustment method by reading and executing the program. The information processing apparatus 1 may also achieve substantially the same functions as those of the embodiment described above by reading the program from a recording medium with a medium reading device and executing the read program described above. The program in this another embodiment is not limited to the one executed by the information processing apparatus 1. For example, the present disclosure may be similarly applied to a case where another computer or a server executes the program or another computer and a server execute the program in cooperation with each other.

The program may be distributed via a network such as the Internet. This program may be recorded on a computer-readable recording medium such as a hard disk, a flexible disk (FD), a compact disc read-only memory (CD-ROM), a magneto-optical disk (MO), or a digital versatile disc (DVD) and may be executed after being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an adjustment program for causing a computer to perform a process comprising:
acquiring a computation performance characteristic that indicates a computation performance value that corresponds to each adjustable dimension, through computation in which a cache memory in a processor that includes the cache memory is used;
extracting, by using the computation performance characteristic, an adjustment condition for adjusting an adjustable dimension for which a decrease in computation performance due to a cache miss caused by a cache-line conflict in the cache memory occurs; and
inserting adjustment processing based on the adjustment condition into a specific program that is executed by the processor and uses the adjustable dimension,
the extracting includes extracting, by using the computation performance characteristic, a section of an adjustable dimension for which a decrease in the computation performance occurs, calculating an adjustable dimension that is greater than an adjustable dimension at an end point of the extracted section and for which the computation performance value is greater than or equal to a predetermined threshold, and extracting the adjustment condition that includes the extracted section and the calculated adjustable dimension.

2. The non-transitory computer-readable recording medium according to claim 1, wherein in the acquiring, the computation performance characteristic is acquired through the computation in which an adjustable dimension is given and continuous addresses are sequentially accessed for data that has a certain data size.

3. The non-transitory computer-readable recording medium according to claim 1, wherein in the extracting the section, the section is extracted by using an arithmetic mean of the computation performance value corresponding to each adjustable dimension.

4. An adjustment method comprising:
acquiring, by a computer, a computation performance characteristic that indicates a computation performance value that corresponds to each adjustable dimension, through computation in which a cache memory in a processor that includes the cache memory is used;
extracting, by using the computation performance characteristic, an adjustment condition for adjusting an adjustable dimension for which a decrease in computation performance due to a cache miss caused by a cache-line conflict in the cache memory occurs; and inserting adjustment processing based on the adjustment condition into a specific program that is executed by the processor and uses the adjustable dimension, the extracting includes extracting, by using the computation performance characteristic, a section of an adjustable dimension for which a decrease in the computation performance occurs, calculating an adjustable dimension that is greater than an adjustable dimension at an end point of the extracted section and for which the computation performance value is greater than or equal to a predetermined threshold, and extracting the adjustment condition that includes the extracted section and the calculated adjustable dimension.

5. An information processing apparatus comprising:

a memory; and a processor coupled to the memory and configured to:

acquire a computation performance characteristic that indicates a computation performance value that corresponds to each adjustable dimension, through computation in which a cache memory in a processor that includes the cache memory is used;

extract, by using the computation performance characteristic, an adjustment condition for adjusting an adjustable dimension for which a decrease in computation performance due to a cache miss caused by a cache-line conflict in the cache memory occurs; and insert adjustment processing based on the adjustment condition into a specific program that is executed by the processor and uses the adjustable dimension, the processor extracts, by using the computation performance characteristic, a section of an adjustable dimension for which a decrease in the computation performance occurs, calculating an adjustable dimension that is greater than an adjustable dimension at an end point of the extracted section and for which the computation performance value is greater than or equal to a predetermined threshold, and extracting the adjustment condition that includes the extracted section and the calculated adjustable dimension.

\* \* \* \* \*